US009251921B2

(12) United States Patent
Dean et al.

(10) Patent No.: US 9,251,921 B2
(45) Date of Patent: Feb. 2, 2016

(54) STEAM GENERATOR UPPER BUNDLE INSPECTION TOOLS

(75) Inventors: Uriah C. Dean, Farmington, NY (US); Matthew R. Jewett, Fairport, NY (US); Steve Moshano, Sodus, NY (US); Bradley DeLaCroix, Walworth, NY (US)

(73) Assignee: R. Brooks Associates, Inc., Williamson, NY (US)

( * ) Notice: Subject to any disclaimer, the term of this patent is extended or adjusted under 35 U.S.C. 154(b) by 1101 days.

(21) Appl. No.: 13/639,479

(22) PCT Filed: May 27, 2010

(86) PCT No.: PCT/US2010/036489
§ 371 (c)(1),
(2), (4) Date: Feb. 15, 2013

(87) PCT Pub. No.: WO2010/138774
PCT Pub. Date: Dec. 2, 2010

(65) Prior Publication Data
US 2013/0142297 A1 Jun. 6, 2013

Related U.S. Application Data

(60) Provisional application No. 61/181,560, filed on May 27, 2009.

(51) Int. Cl.
*F22B 37/38* (2006.01)
*G21C 17/013* (2006.01)
(Continued)

(52) U.S. Cl.
CPC .............. *G21C 17/013* (2013.01); *B62D 55/00* (2013.01); *F22B 37/002* (2013.01); *Y10S 901/01* (2013.01)

(58) Field of Classification Search
CPC ....... F22B 37/002; F22B 37/38; G21C 17/00; G21C 17/01; G21C 17/013
USPC .......................... 73/104, 105, 112.02, 113.01
See application file for complete search history.

(56) References Cited

U.S. PATENT DOCUMENTS 4,231,419 A 11/1980 Gugel
4,661,309 A * 4/1987 Hayes ...................... B25J 5/007
165/11.2

(Continued)

FOREIGN PATENT DOCUMENTS

CN 1225742 8/1999
CN 1309598 8/2001
(Continued)

OTHER PUBLICATIONS

Extended European Search Report for PCT/US2010036489 dated Feb. 11, 2014.

*Primary Examiner* — Eric S McCall
(74) *Attorney, Agent, or Firm* — Nixon Peabody LLP

(57) ABSTRACT

An inspection system for inspecting the interior of a steam generator includes, in one aspect, a first boom and a second, telescoping boom having a proximal end pivotally attached to the first boom and a distal end bearing a delivery capsule, the delivery capsule defining a storage bay. The inspection system includes a first robotic inspection vehicle dimensioned to fit in the delivery capsule storage bay and itself defines a storage bay. The first robotic inspection vehicle includes at least one inspection camera and at least one lighting system. The first robotic inspection vehicle further includes cabling connecting the first robotic inspection vehicle to the delivery capsule. The inspection system also includes a second robotic inspection vehicle dimensioned to fit in the first robotic inspection vehicle storage bay. The second robotic inspection vehicle includes at least one inspection camera and at least one lighting system and further includes cabling connecting the second robotic inspection vehicle to the first robotic inspection vehicle.

20 Claims, 22 Drawing Sheets

(51) Int. Cl.
*F22B 37/00* (2006.01)
*B62D 55/00* (2006.01)

(56) References Cited

U.S. PATENT DOCUMENTS

| | | | |
|---|---|---|---|
| 4,709,265 A * | 11/1987 | Silverman | B62D 1/28 348/158 |
| 5,022,812 A | 6/1991 | Coughlan et al. | |
| 5,265,129 A | 11/1993 | Brooks et al. | |
| 5,265,667 A * | 11/1993 | Lester, II | F22B 37/005 165/11.2 |
| 5,284,096 A | 2/1994 | Pelrine et al. | |
| 5,388,528 A | 2/1995 | Pelrine et al. | |
| 5,451,135 A | 9/1995 | Schempf et al. | |
| 5,504,788 A | 4/1996 | Brooks et al. | |
| 5,782,209 A | 7/1998 | Vandenberg | |
| 6,076,407 A * | 6/2000 | Levesque | G01N 29/223 324/220 |
| 6,145,583 A | 11/2000 | Gay et al. | |
| 6,487,922 B1 * | 12/2002 | Bauer | G01N 29/225 356/3.03 |
| 6,529,869 B1 | 3/2003 | Wietzke et al. | |
| 6,621,516 B1 * | 9/2003 | Wasson | H04N 7/185 348/36 |
| 6,887,014 B2 | 5/2005 | Holland | |
| 8,418,662 B2 * | 4/2013 | Kim | F22B 37/003 122/363 |
| 8,605,145 B2 | 12/2013 | Webster et al. | |
| 2002/0073788 A1 * | 6/2002 | Hatley | B25J 5/00 73/866.5 |
| 2005/0056105 A1 * | 3/2005 | Delacroix | G01N 29/043 73/865.8 |
| 2009/0133515 A1 * | 5/2009 | Gershtein | B08B 9/049 73/865.8 |
| 2012/0197440 A1 * | 8/2012 | Farkavec | B08B 9/049 700/264 |
| 2013/0231779 A1 * | 9/2013 | Purkayastha | B25J 9/1697 700/259 |

FOREIGN PATENT DOCUMENTS

| | | |
|---|---|---|
| CN | 1992096 | 7/2007 |
| EP | 0423013 A1 | 4/1991 |
| JP | S5149778 | 4/1976 |
| JP | S5744139 | 3/1982 |
| JP | S58146955 U | 10/1983 |
| JP | 2001-205327 | 7/2001 |
| JP | 2007 161273 A | 6/2007 |
| WO | WO 97/50005 | 12/1997 |

* cited by examiner

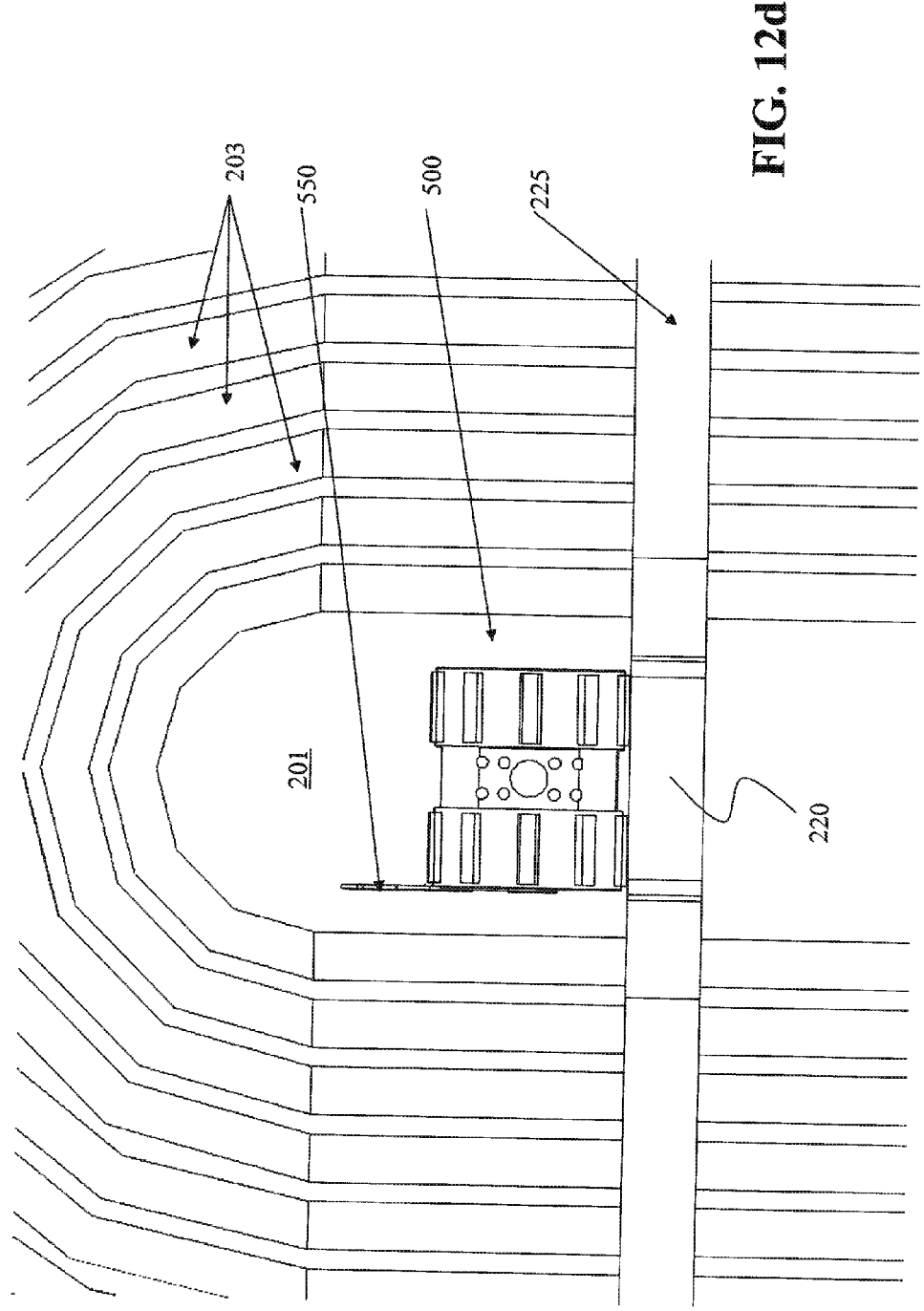

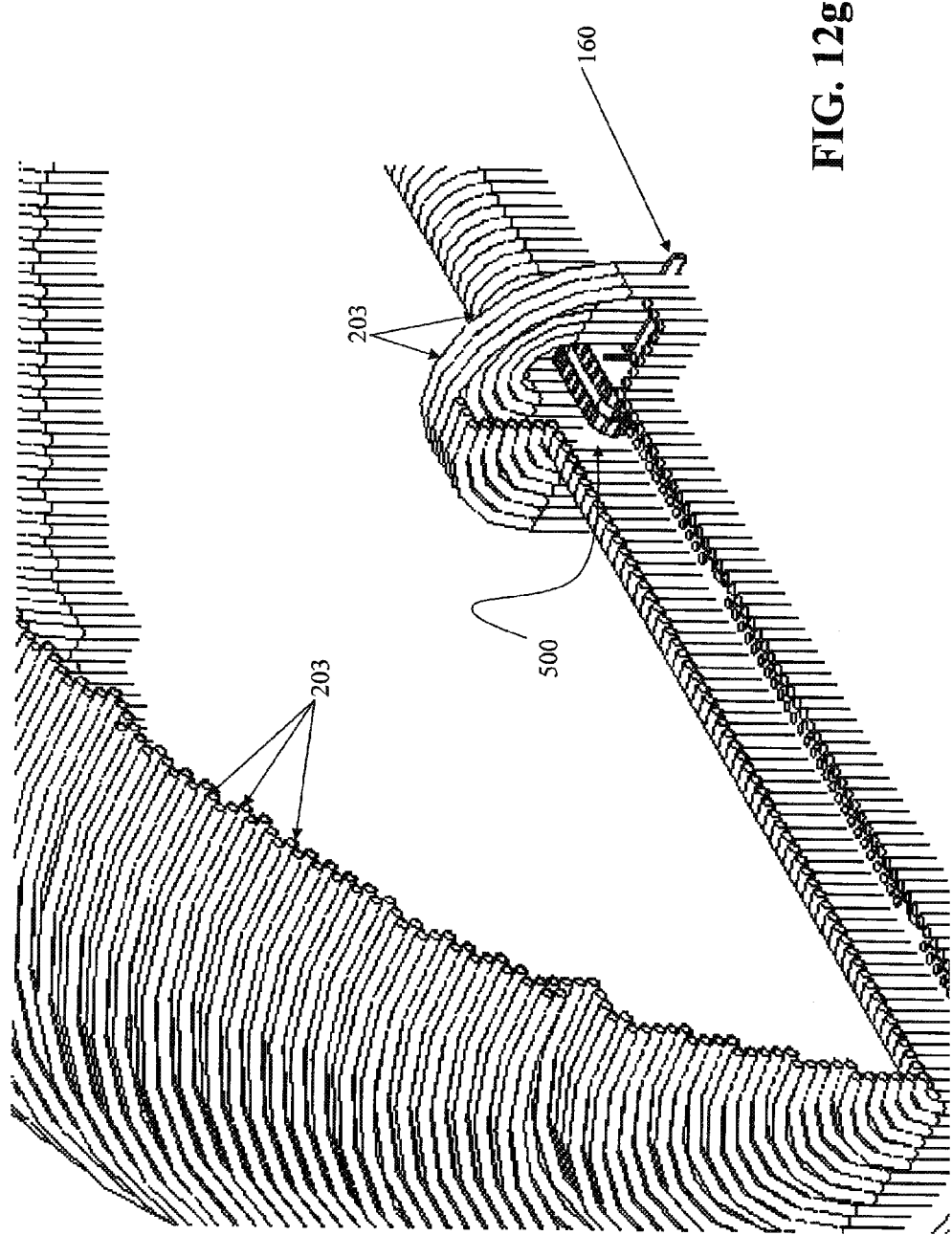

STEAM GENERATOR UPPER BUNDLE INSPECTION TOOLS

CROSS-REFERENCE

This application is a U.S. national stage of International Patent Application No. PCT/US2010/036489, filed May 27, 2010, which claims the benefit of U.S. Provisional Patent Application No. 61/181,560 filed on May 27, 2009, the contents of which are each incorporated herein by reference in its entirety.

FIELD OF THE INVENTION

The present invention relates to the field of inspection devices generally, and more specifically to power plant steam generator inspection devices, and still more specifically to nuclear power plant steam generator inspection devices.

BACKGROUND OF THE INVENTION

In a nuclear reactor power plant, a nuclear reactor vessel is used to generate heat for the production of steam and electricity. The reactor vessel is typically a pressurized vessel enclosing a core of nuclear fuel and cooling water. Such nuclear power plants typically contain three major components: a reactor vessel containing fuel which produces superheated water for transport to one or more steam generators, which output steam to drive a multi-stage steam turbine to generate electric power.

The superheated water is transported to the steam generator by pipes. These pipes feed the water into numerous tubes within the steam generator. These tubes are U-shaped, feeding the water back to the pipes at the outlet of the steam generator to be re-circulated back to the reactor. The tubes in a nuclear steam generator typically form an inverted "U" separated by a lane, and held together by a plurality of support plates, separated at periodic vertical intervals. The height of each tube row may exceed thirty-two feet. Six to eight or more support plates are used, each separated vertically at three to six foot intervals. In the steam generator, the tube carrying the superheated water are quenched with cool water, which generates the steam which drives the turbine to produce electricity.

This procedure for generating steam presents several problems. The water used to quench the tubes often has impurities and chemicals which may corrode both the steam generator tubes and the support plates and lead to other damage. Even though periodic inspections of nuclear steam generators are required for compliance with safety regulations, monitoring steam generator cleanliness remains a problem. The highly corrosive environment of the steam generator is particularly problematic for many of the older nuclear reactors in service throughout the world.

In the past, steam generator tubes and support plates were inaccessible for visual inspection. Information was gathered by complicated systems which could not adequately inspect all sections of tubes and support plates. Because of the highly radioactive environment and the heat of the pipes, direct visual human inspection has typically been restricted to between three and five minutes per man per six month period. This time period does not provide ample opportunity for the careful inspection for corrosion, holes and leaks. It is therefore difficult to inspect within the narrow lanes and tube separation gaps at the support plates, because of the heat, radioactivity and narrowness of the lanes separating the tubes.

Tubes typically extend through support plates at quatrefoil holes. These openings provide flow through features to improve water flow in the generator and to reduce the build-up of sediment at the support plates. Nevertheless, the small areas where the quatrefoil opening must contact the tube results in areas of material build-up on the tubes, or even adherence of material being "plated out" on the tubes. This material will contribute to premature corrosion of the tubes. With known inspection devices, this condition will go undetected on all but the tubes bordering the lane.

Further, the orientation of component parts within steam generators provides extreme challenges to designing workable devices for inspecting such areas. Insertion holes (also known as hand holes) at the bottom of the steam generators are often as small as a five or six inch diameter. For the purpose of this application such portals will be referred to inclusively as access ports. Flow distribution baffles within the generator often obstruct any room to maneuver equipment within the generator. Inspection within steam generators at elevations as high as thirty feet or more provide significant engineering challenges. In addition, the flow slots between tube rows are often less than two inches wide and tube separation gap dimensions are often less than one inch (down to about 0.30 inches).

SUMMARY OF THE DISCLOSURE

The aspects of the present concepts disclosed herein are generally directed to coin exchange machines configured to provide security measures to guard against the unauthorized access and/or use, and to protect against counterfeiting or forging of vouchers or negotiable instruments issued therefrom.

In some aspects of the present concepts, an inspection system for inspecting the interior of a steam generator includes a first boom and a second, telescoping boom having a proximal end pivotally attached to the first boom and a distal end bearing a delivery capsule, the delivery capsule defining a storage bay. The inspection system includes a first robotic inspection vehicle dimensioned to fit in the delivery capsule storage bay and itself defines a storage bay. The first robotic inspection vehicle includes a drive system, at least one inspection camera and at least one lighting system. The first robotic inspection vehicle further includes cabling connecting the first robotic inspection vehicle to the delivery capsule. The inspection system also includes a second robotic inspection vehicle dimensioned to fit in the first robotic inspection vehicle storage bay. The second robotic inspection vehicle includes at least one inspection camera and at least one lighting system and further includes cabling connecting the second robotic inspection vehicle to the first robotic inspection vehicle.

In another aspect of the present concepts, a vehicular inspection system for inspecting the interior of a steam generator includes a magnetic inspection vehicle comprising a drive system utilizing magnets, electromagnets, or a combination thereof to facilitate vertical movement of the magnetic inspection vehicle along a vertical surface comprising a ferrous metal, the magnetic inspection vehicle defining a storage bay and comprising at least one inspection camera and at least one lighting system, the magnetic inspection vehicle further comprising cabling connecting the magnetic inspection vehicle to, at a distal end, to one or more of a cable management system, a video screen, a power supply, and a controller outside of a steam generator. The vehicular inspection system also include an in-bundle robotic inspection vehicle dimensioned to fit in the magnetic inspection vehicle storage bay, the in-bundle robotic inspection vehicle comprising a drive system, at least one inspection camera and at least one lighting system and further comprising cabling connecting the in-bundle robotic inspection vehicle to the magnetic inspection vehicle.

In still another aspect of the present concepts, a vehicular inspection system for inspecting the interior of a steam generator includes a first inspection vehicle comprising a dual track drive system, a plurality of inspection cameras and a plurality of lights, the first inspection vehicle comprising a chassis defining an internal storage bay, the magnetic inspection vehicle further comprising cabling connecting the magnetic inspection vehicle to a distal controller. An in-bundle robotic inspection vehicle is also provided and comprises a single track drive system, the in-bundle robotic inspection vehicle being dimensioned to fit in the first inspection vehicle internal storage bay, the in-bundle robotic inspection vehicle comprising a plurality of inspection cameras and a plurality of lights and further comprising cabling connecting the in-bundle robotic inspection vehicle to the first inspection vehicle.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings.

FIG. 12d is a front view of an inspection vehicle in accord with at least some aspects of the present concepts disposed on a top steam generator support plate.

FIGS. 12g-12h are perspective cut-away views of an inspection vehicle deploying an in-bundle rover in accord with at least some aspects of the present concepts disposed on a top steam generator support plate.

Figure 1:
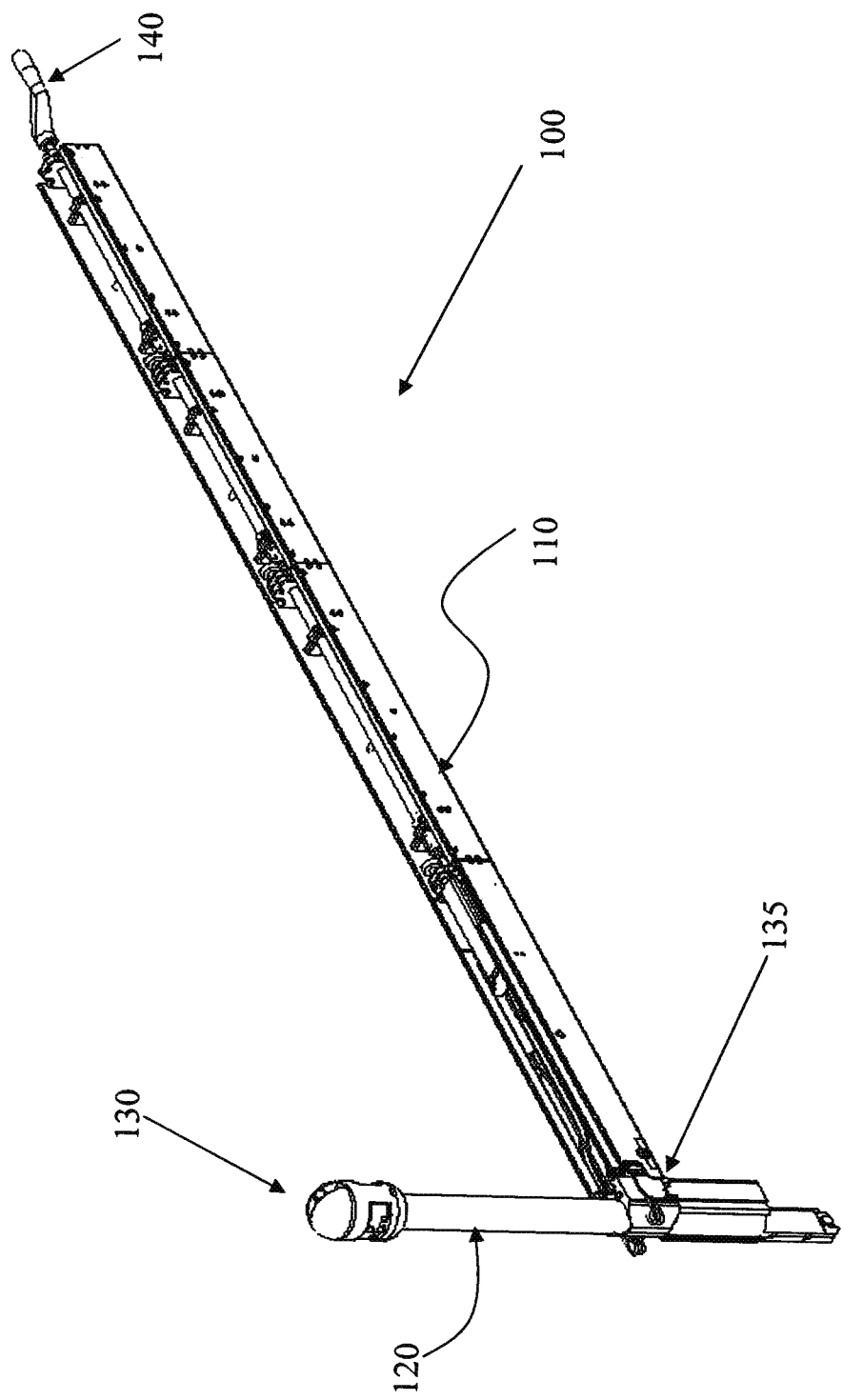
FIG. 1 shows a perspective view of a vertical deployment system (VDS) for steam generators in accord with at least some aspects of the present concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

FIGS. 1-9 show various aspects of a vertical deployment system (VDS) 100 generally corresponding in structure to the device for inspecting the interior of steam generators disclosed in U.S. Pat. No. 6,145,583, issued on Nov. 14, 2000, to Gay et al., which device is configured to visually inspect steam generator tubes, including upper portions of steam generator tubes, tops and bottoms of support plates, wrapper-to-support plate welds, and other steam generator internal structures.

In general, the VDS 100 is designed for a vertical lift of instruments, sensors, tools and/or payloads about 30-33 feet or more, depending on the structure of the particular type of steam generator to be inspected. In the accompanying figures, the steam generator represented is the FRAMATOME model 68/19, but the VDS may be utilized in other steam generators such as, but not limited to the Westinghouse Model F steam generator and other steam generators. The VDS 100 is deployable on steam generator models having the Flow Distribution Baffle (FDB) 275 (see FIG. 3) on center or below the hand hole access which have at a minimum a 4" (102 mm) diameter clear access into the steam generator. In an alternative configuration, a deployable support may be utilized in combination with the rail assembly 110 to provide a support to another steam generator component or surface. In yet another configuration, the rail assembly may be simply connected to the access port 205 such that the rail assembly is cantilevered within the steam generator. The steam generator support plates 225 must also contain flow holes in the approximate dimension of about 3.5" (89 mm) in diameter or equivalent in width for a rectangular cut out, or larger.

The VDS 100 comprises two main structural components, a rail assembly 110 (e.g., a "first boom") and a telescoping boom assembly 120 (e.g., "second boom"). In at least some aspects of the present concepts, the telescoping boom assembly 120 comprises a hydraulically-actuated stacked cylinder set and, at a distal end, a delivery capsule 130, described below.

The rail assembly 110 of the VDS 100, as is shown in FIGS. 1-5, for example, is disposed through an access port 205 of the steam generator 200 wall and is attached to an access port flange (not shown) by an access port mounting plate (not shown). When the rail assembly 110 is attached, at a proximal end, to the access port 110, the rail assembly provides a stabilization leg that provides system stability for deployment of the telescoping boom assembly 120, such as is shown in U.S. Pat. Nos. 5,265,129, 5,504,788, and 6,145,583, each of which is incorporated by reference in its entirety herein. The rail assembly 110 attaches, at a distal end, to the telescoping boom assembly 120 at a pivot clamp 135 that can be manually actuated or actuated via a conventional actuating device, such as a rotary actuator or a linear actuator.

Figure 3:
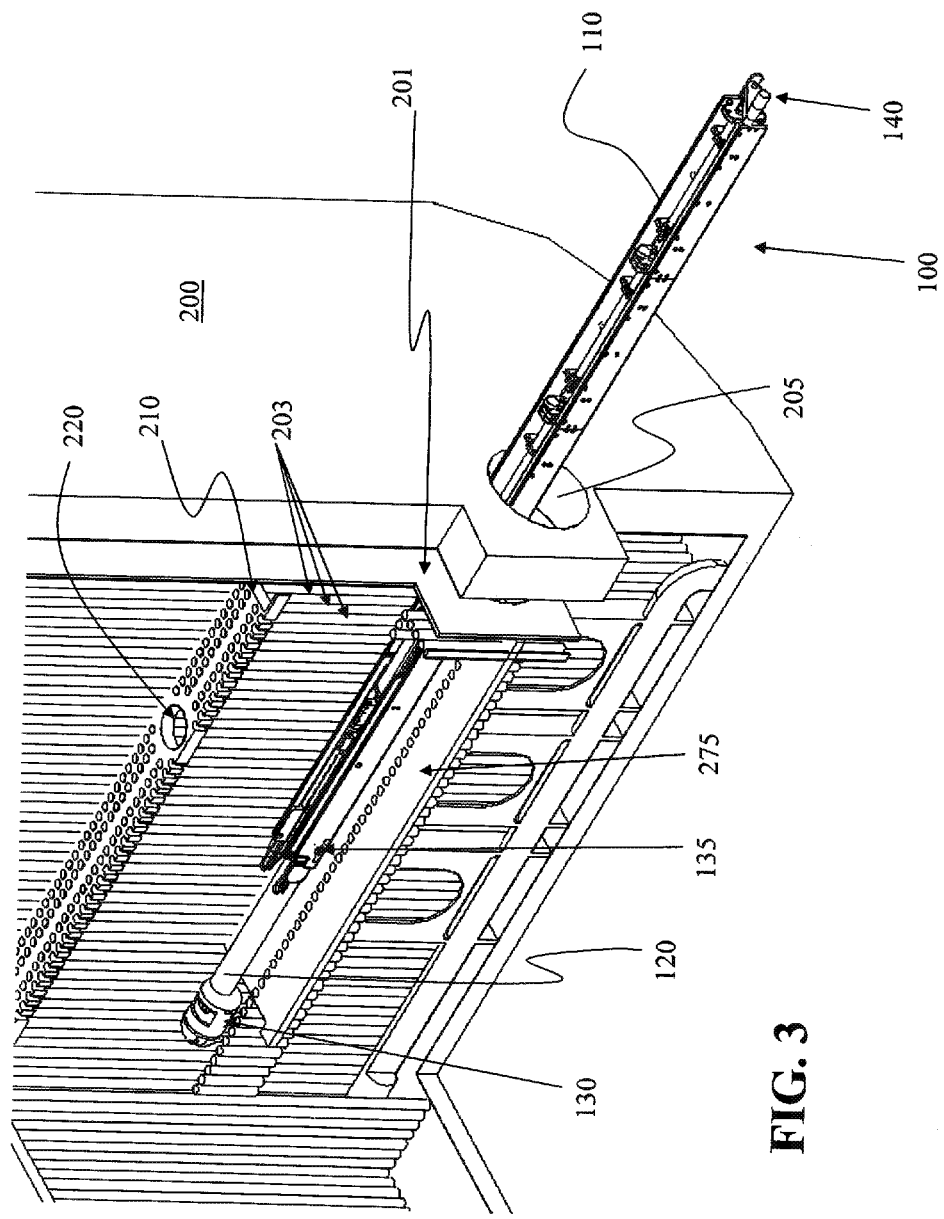
FIG. 3 shows the VDS of the preceding figures inserted into a steam generator in accord with at least some aspects of the present concepts.

In at least one configuration, a rack drive servo motor attaches to the access port mounting plate and a manual crank handle 140 drives a linkage (e.g., gear(s) or gear(s) and rod(s)) attached at a distal end to the pivot clamp 135, which is secured to the telescoping boom assembly 120. Once the VDS 100 is inserted in thru the tube lane or "no-tube lane" as it is sometimes called, shown in FIGS. 3-5, and secured, the telescoping boom assembly 120 can then be up-righted using the mechanical crank handle 140. The tube lane is the narrow area created by the innermost inverted U-tubes. Steam enters one side of the U-bend (the hot pipe) and travels around the U-bend of the pipe and is quenched by the cool water in the steam generator and proceeds around to the other side of the U-bend (the cool pipe). The manual crank handle 140 is operatable to both deploy the telescoping boom 120 and to retract the telescoping boom to the retracted position for extraction of the VDS 100. In lieu of the manual crank, one or more actuators (e.g., linear actuator(s), rotary actuator(s), or combination thereof, etc.) could alternatively be used. As is shown in FIG. 3, following securement of the VDS 100 to the access port 205 of the steam generator 200, the retracted or folded VDS is extended horizontally into the steam generator through the flanged access port and through the steam generator wrapper 201. In this configuration, the telescoping boom assembly 120 is aligned to be substantially parallel with the rail assembly 110 to facilitate insertion through the access port 205.

The VDS 100 is disposed initially near the base of the steam generator 200 in the tube lane, the narrow area created by the innermost inverted U-tubes 210, and more specifically through the "no-tube lane" thereof, as is shown in FIG. 3. In this installed configuration, the VDS 100 system is about 90" long, 4" high, and 4" wide. This length can be adjusted to a greater or lesser length during the installation process via insertable and removable section if the plant geometry and drawback requirements dictate.

Figure 4:
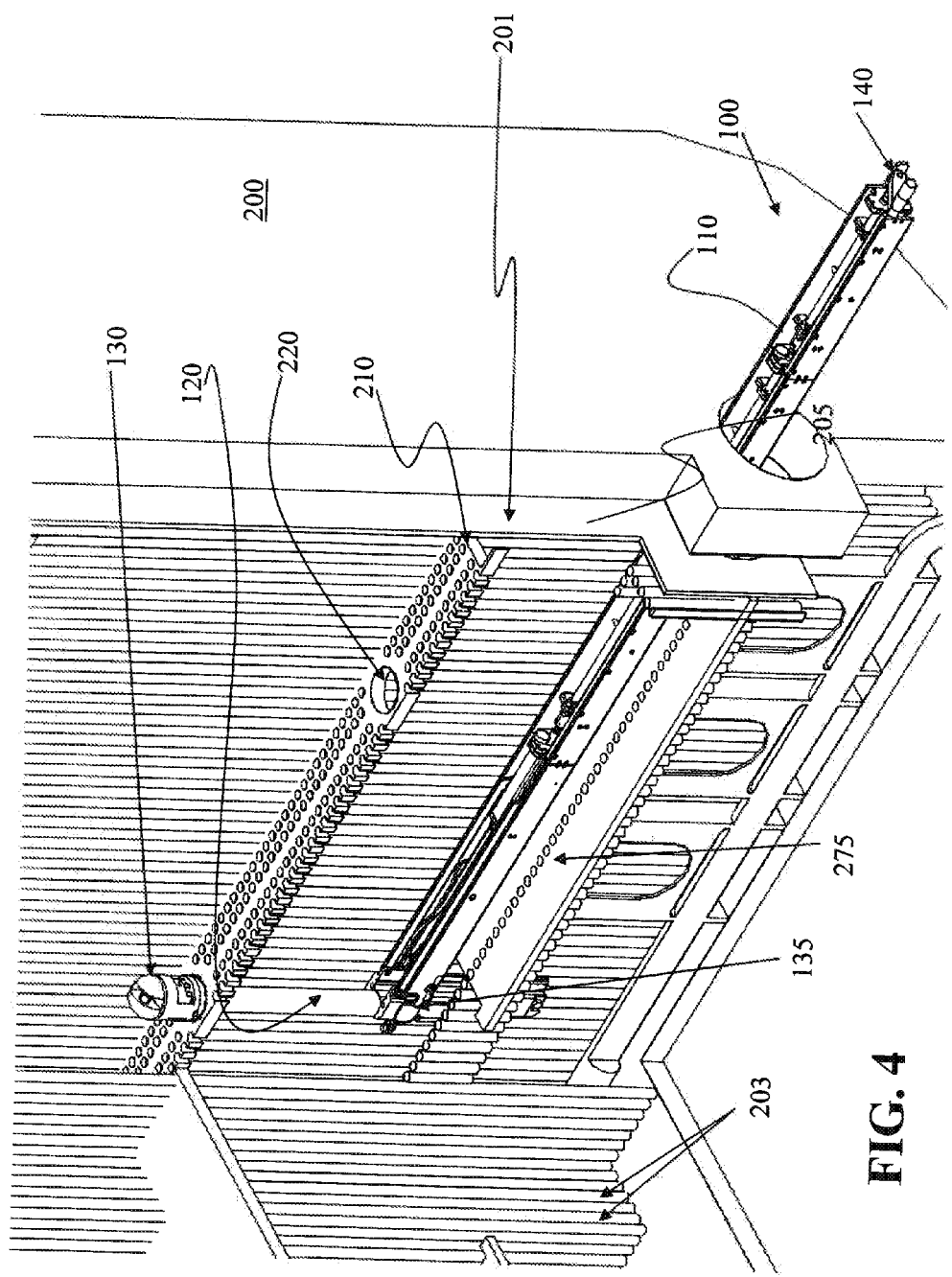
FIG. 4 shows the VDS of the preceding figures in an installed and collapsed state in a steam generator in accord with at least some aspects of the present concepts.
Figure 5:
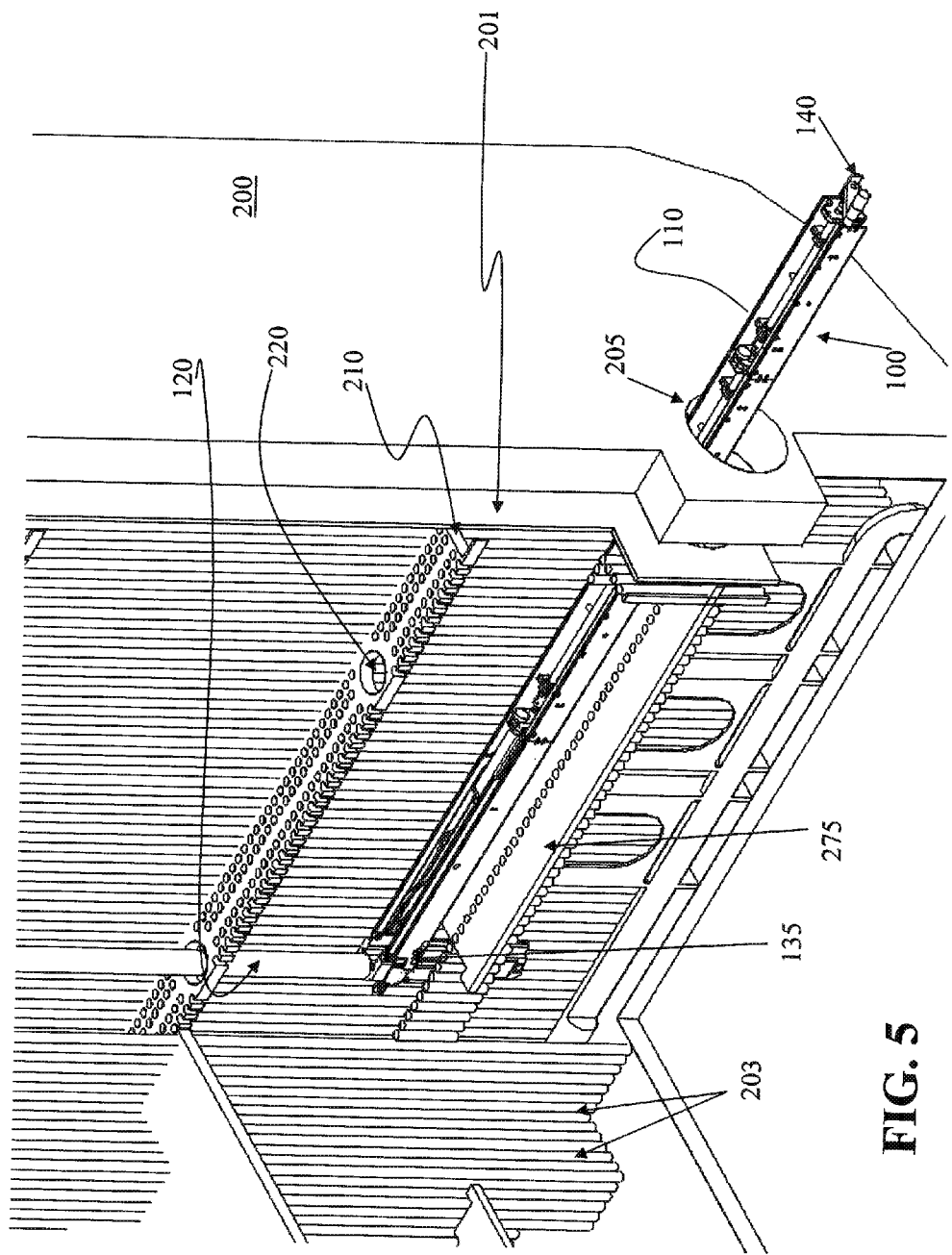
FIG. 5 shows the VDS of the preceding figures in an installed and extended state in a steam generator in accord with at least some aspects of the present concepts.
Figure 6:
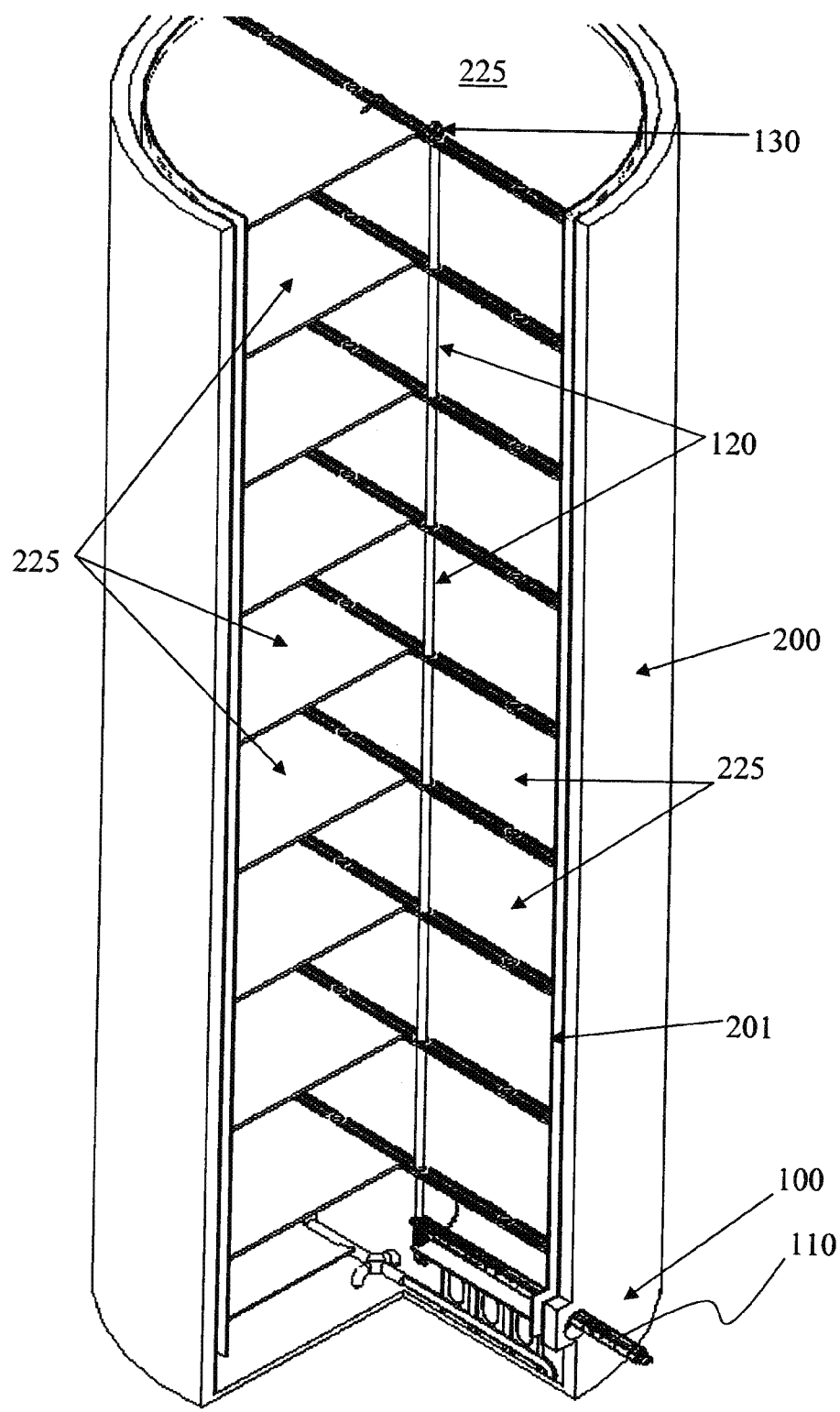
FIG. 6 shows another view of the VDS of the preceding figures in an installed and extended state in a steam generator in accord with at least some aspects of the present concepts.

Once the VDS 100 is installed horizontally through the access portion, as shown in FIG. 3, the telescoping boom assembly 120 and delivery capsule 130 borne thereby is raised to a vertical position in the tube lane to a height of about 30", and extended via actuation of the telescoping boom assembly 120 stacked cylinder set, through a flow slot 220 in the support plates 225 of the steam generator, as is shown in FIG. 4. FIG. 5 shows continued extension of the telescoping boom assembly 120 and delivery capsule 130 borne to successively higher flow slots 220 in higher support plates 225, as is further shown in FIG. 6.

Figure 2A:
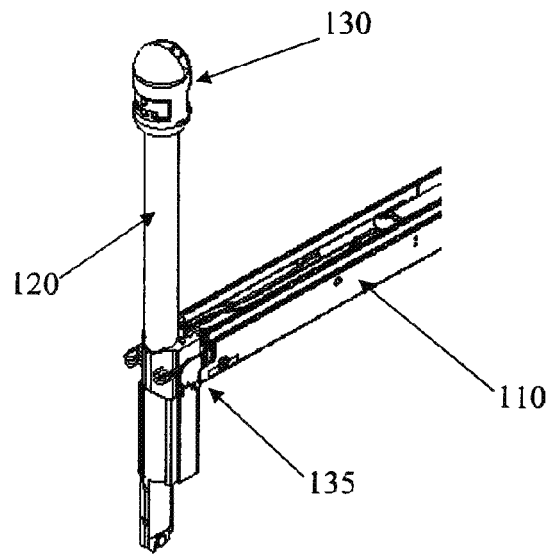
FIGS. 2a-2b show views of a portion of the VDS of FIG. 1 showing a delivery capsule in accord with at least some aspects of the present concepts.
Figure 2B:
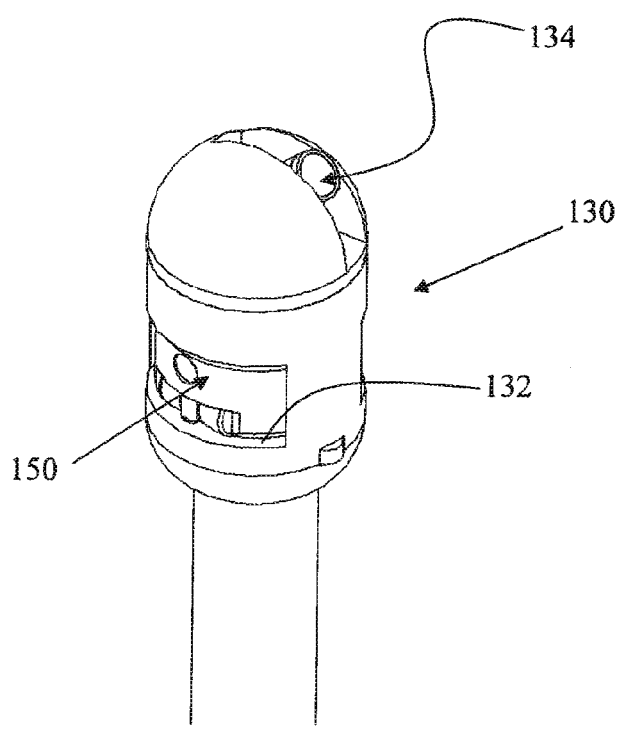
Figure 7:
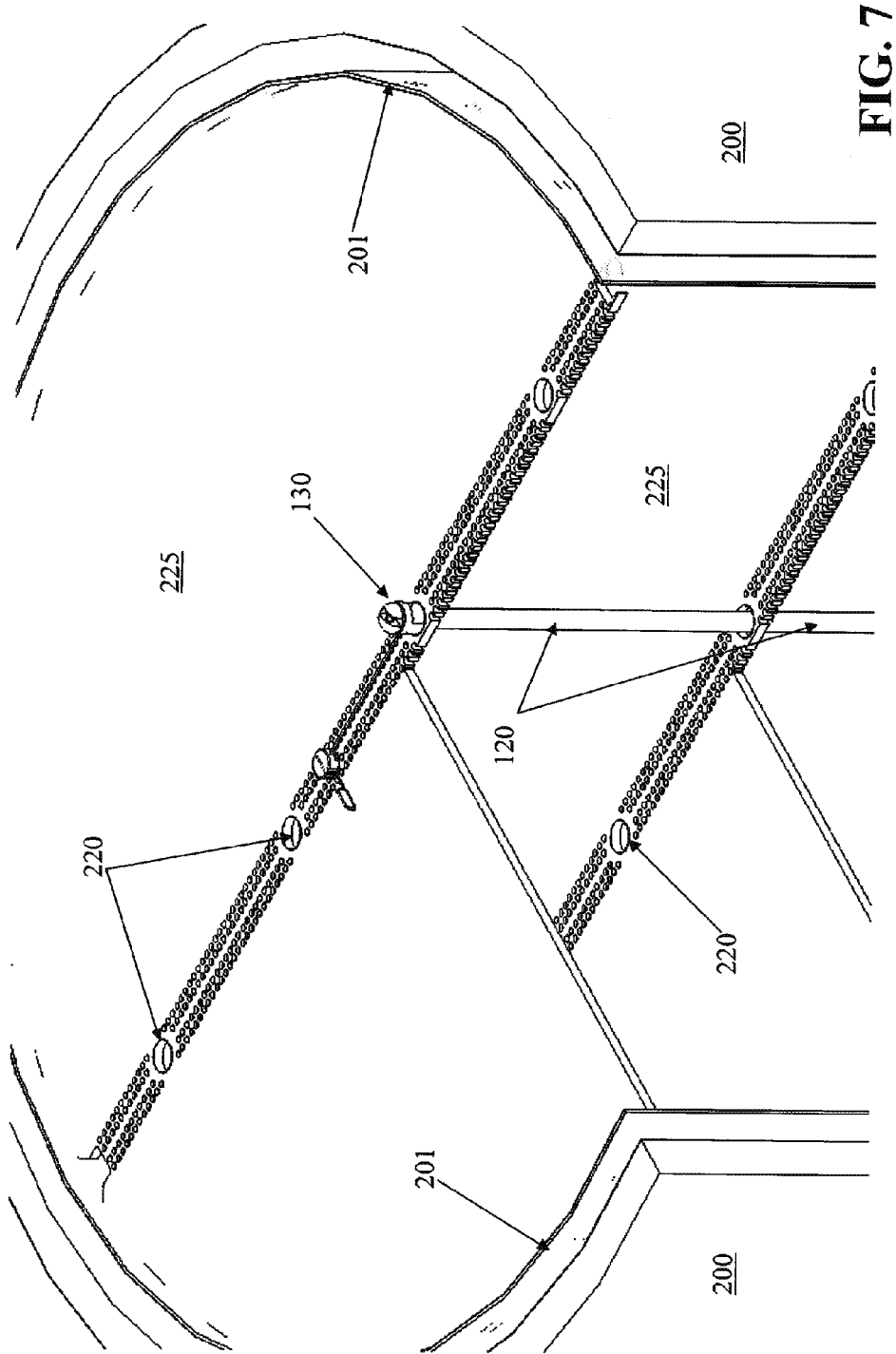
FIG. 7 shows another view of the VDS of the preceding figures in an installed and extended state in a steam generator, wherein a rover is deployed, in accord with at least some aspects of the present concepts.

A camera 134 is provided at a top portion of the delivery capsule 130 and may comprise a fixed camera or, as is shown in FIG. 2b, a pan, tilt and/or zoom camera. The delivery capsule 130 itself may be fixed to a distal end of telescoping boom assembly 120 or may alternatively be rotatably attached thereto with an associated drive system (e.g., motor, rotary actuator, etc.) to rotate the delivery capsule 130 through a selected range. The camera 134 enhances the operator's ability to navigate the delivery capsule 130 vertically through the flow slots 220 and, for the pan, tilt and/or zoom embodiment, provides additional visual inspection capability as well. FIG. 7 shows the delivery capsule 130 extending through an inner flow slot 220 above a steam generator 200 support plate 225.

The rail assembly 110 is configured to be moved in or out of the steam generator 200 to align the telescoping boom assembly 120 with a desired one of the flow slots along the support plates 225. The rail assembly 110 may be moved back and forth slightly or jogged to facilitate vertical movement of the telescoping boom assembly 120 so as to keep the delivery capsule 130 aligned with the flow slot 220 in each support plate 225. The telescoping boom assembly 120 is able to extend telescopically to any desired vertical position in the steam generator 200 along the flow slots 220. As noted above, the support plates 225 are disposed in a spaced relation vertically throughout the height of the steam generator at about three foot to six foot intervals, depending on the make and model of the steam generator.

As is represented in FIGS. 3-5, for example, the hydraulically-controlled telescoping boom assembly 120 is activated to extend vertically to a desired height within the steam generator 200. The vertical movement of the telescoping boom assembly 120 and/or horizontal movement of the rail assembly 110 may be computer-controlled or, alternatively, manually controlled. When the telescoping boom assembly 120 is initially deployed into a vertical position at a desired horizontal position, the horizontal position is verified. This verification may be accomplished either visually (e.g., by reference to the tube columns or other visual landmarks), via mechanical or electromechanical devices (e.g., mechanical distancing apparatuses, such as pulleys or gears, rotary encoders, etc.), or via one or more positioning sensors. To facilitate horizontal or lateral movement of the telescoping boom assembly 120, a registration apparatus is preferably provided, the registration apparatus (not shown) comprising sets of registration guides (e.g., finger-like projections) that can be selectively pneumatically powered outwardly from a retracted position at rest or inwardly from an extended position. When each guide set is extended, one guide set contacts the hot leg of a U-tube and one guide set contacts the "cold" leg of the same U-tube.

Hydraulic control of the telescoping boom assembly 120 is provided by a conventional electrically driven hydraulic pump system. The presently preferred hydraulic pump for the telescoping boom assembly 120 comprises a centrifugal vane pump, pressure relief valve, two proportional control valves, a solenoid block valve, a fluid reservoir and pressure gauges. Control power and signals are fed from the main control console over a single cable and main 110V AC power to operate the pump is obtained from a source local to the pump. The telescoping boom assembly 120 may alternatively comprise a pneumatically-driven design, as opposed to hydraulically-driven.

Figure 14:
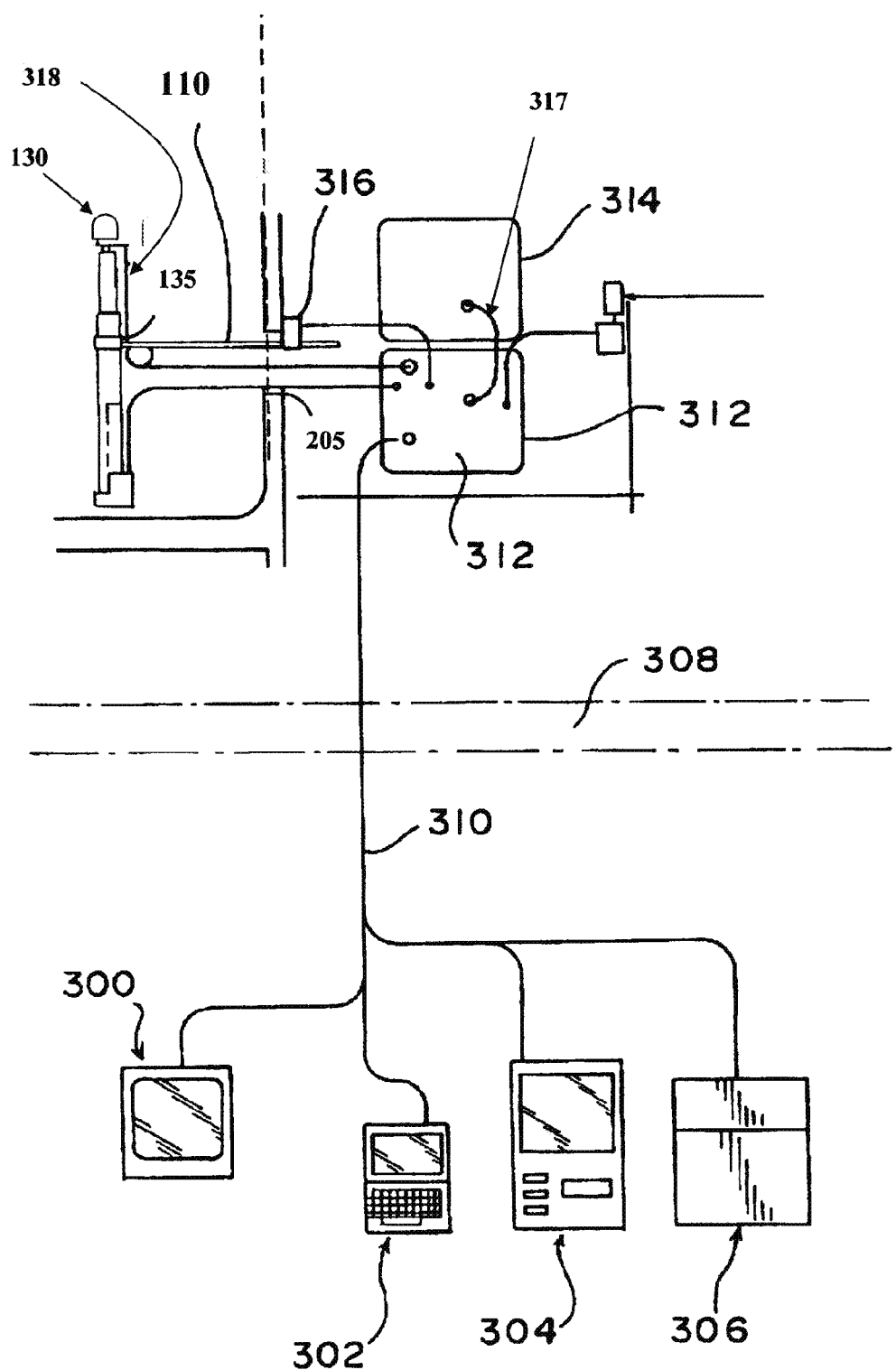
FIG. 14 shows an example of a control layout for the VDS of FIGS. 1-10.

Operation of the VDS 100 are controlled by a main operating station where data from the VDS instrumentation and cameras (and systems deployed by the VDS) are stored in or on a physical storage media and/or viewed. FIG. 14 is a schematic of one potential control layout for the VDS 100. Area monitor 300, control interface computer 302, optional auxiliary electronics 304, and hydraulic pump 306 are preferably positioned outside of a bioshield 308 and have their cables 310 directed to control electronics 312 and power and air supplies 314, which are set up adjacent the generator access opening 321. A rack and pinion drive 316 is attached to rail assembly 110 which is attached to pivot clamp 135. The control hardware for the present invention is optionally divided into primary control hardware and operator station hardware, wherein the primary control hardware is set up at the steam generator platform. In this configuration, the primary control hardware comprises two small suitcase-sized cases 312, 314, the first containing the main control console 312 and the second case 314 containing bulk power supplies. Plant supplied AC power and compressed air are supplied to these cases for system operation. A switching-type power supply provides power to computer hardware from the main control console case.

The main control console 312 provides the system manual control capability. Power for motor loads, lighting, cameras and support circuitry is supplied by the bulk power supply case 314 via appropriate electrical connectors 317. Line 318 represents control cabling for the delivery capsule 130 and all associated systems including, but not limited to, electrical power cable, A/V cables, pneumatic supply line, etcetera, to operate all delivery capsule systems and subsystems. All system component connections terminate at the main control console 302. The operator station for the device preferably contains a control computer 302, running a graphical user interface (e.g., a Microsoft Windows® platform), associated control hardware 304, video monitoring 300 and recording equipment and audio communication equipment. In one embodiment, audio communications link the steam generator platform and the operator station to assist in setup, installation, and/or operation.

Figure 8:
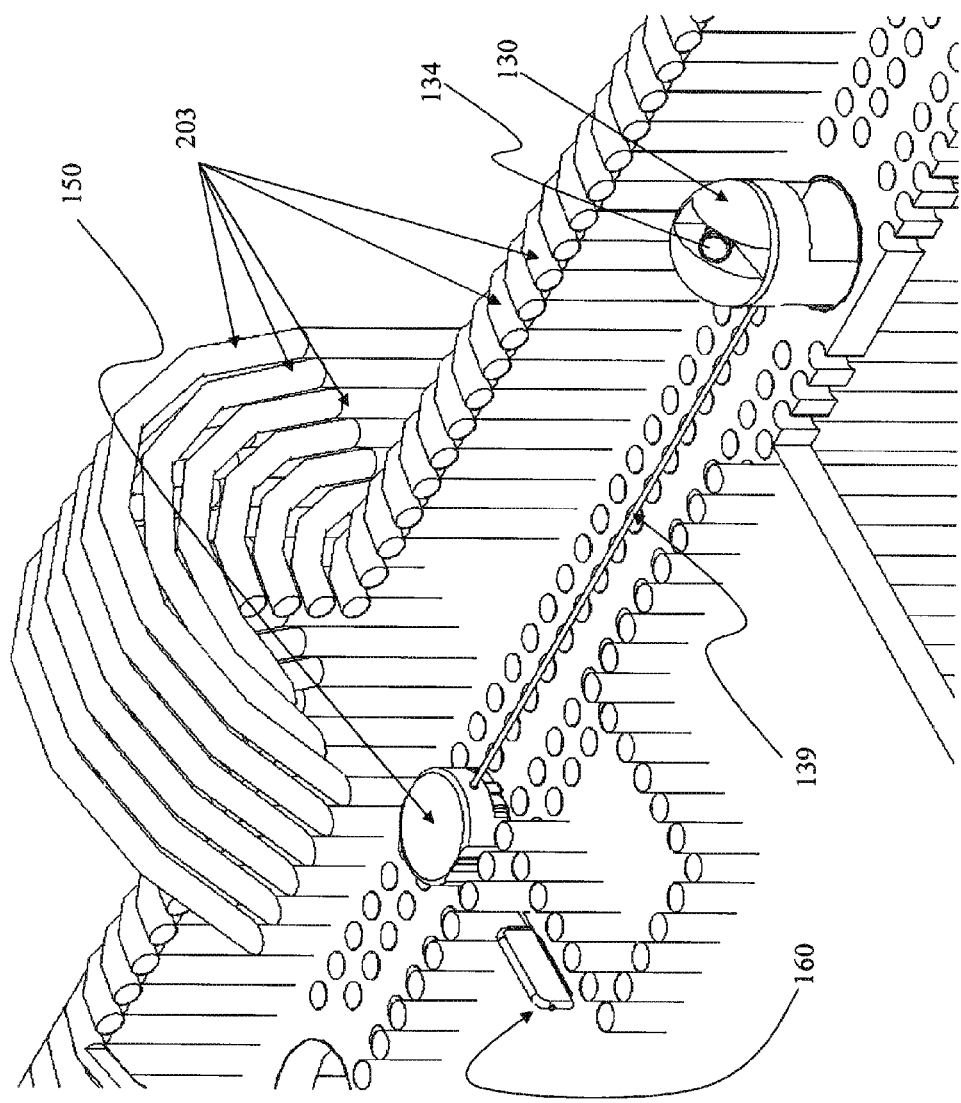
FIG. 8 shows another view of the delivery capsule, deployed rover and deployed in-bundle rover in accord with at least some aspects of the present concepts.
Figure 9:
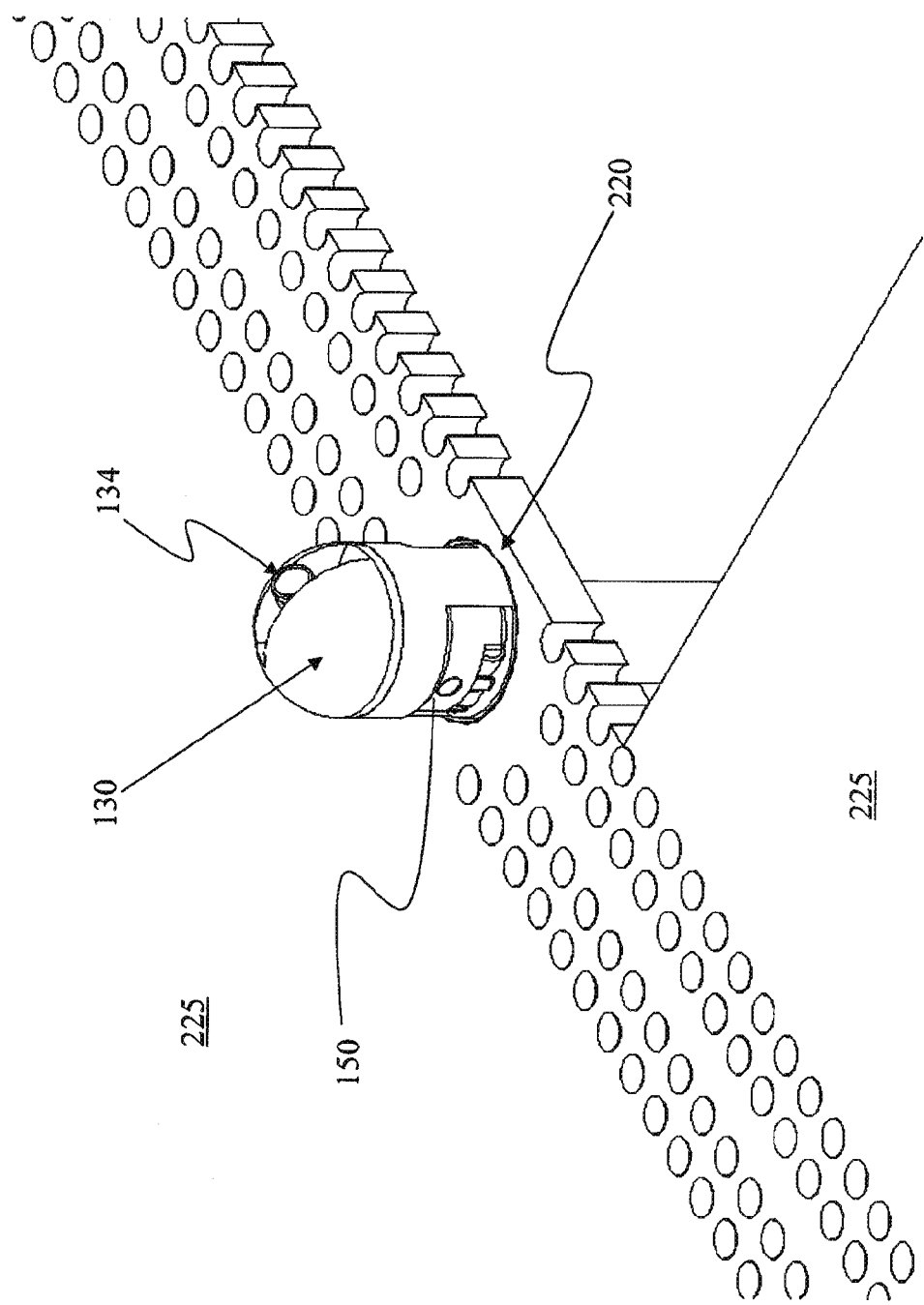
FIG. 9 shows a view of the delivery capsule with the rover retained therein in accord with at least some aspects of the present concepts.
Figure 10:
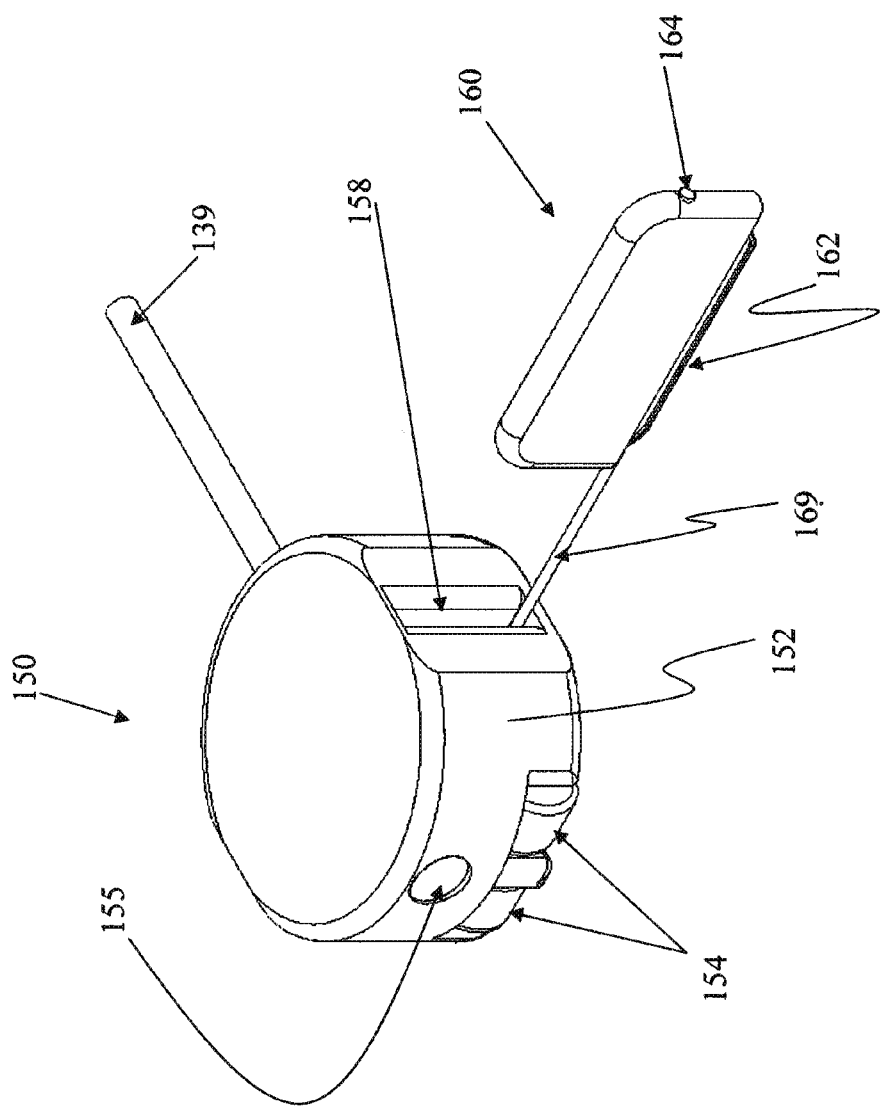
FIG. 10 shows a view of a deployed rover and deployed in-bundle rover in accord with at least some aspects of the present concepts.

As described above, the VDS 100 is used to access internal regions of steam generators, specifically the various support plate 225 elevations. Following extension of a distal end of the telescoping boom assembly 120 to a desired support plate 225, such as is shown in FIG. 7, a robot or "rover" 150 is deployed from the delivery capsule 130, such as is shown in FIG. 8. The rover 150 is controlled via a tether/umbilical cable 155 housing all control, video and auxiliary conductors necessary for operation of and positive retention of the rover 150 and all associated systems. On-board equipment for the rover 150 may comprise, but is not limited to, one or more cameras or video recording devices, one or more LED packages or other lighting systems, one or more examination probes, an eddy current sensor and deployment tool, and/or retrieval tooling.

The rover 150 chassis comprises a main frame 152 to which all components are attached to or reside within. Twin polymer tracks 154 are mounted on either side of the frame centerline and are independently driven by respective DC servo-gear motors for use with a closed loop control system or by DC stepper motors allowing use of an open loop control system.

To facilitate operation and examination of steam generator internals, a plurality of on-board camera assemblies are advantageously provided to provide visual feedback not only of the steam generator internals, but also of the immediately surroundings of the rover, such as to facilitate navigation. In one aspect, a first camera assembly 155, which may be a black and white camera or a color camera utilizing LED lighting or an infrared camera utilizing infra red LEDs, is mounted on the front of the crawler. In another aspect, a second camera assembly (not shown) is mounted on another side of the rover 150 (e.g., a back side or a lateral side). These camera systems for the rover 150, where a plurality of cameras are provided, advantageously comprise a mix of color cameras, utilizing LED lighting, and infrared cameras utilizing infra red LED's. Examination of the no-tube lane, or other accessible portions of the steam generator, may be accomplished using one or more of the rover 150 cameras while the rover is securely retained within the delivery capsule 130.

In-bundle examination (i.e., examination between the steam generator U-tubes 203) can be accomplished by deploying, from a cavity or storage bay 158 of the rover 150, a small, mechanized in-bundle rover 160 that itself comprises on-board video and lighting (color video, IR, UV, CCD, etc.) and optionally, one or more additional sensors and/or tools (e.g., a retrieval tool). The in-bundle rover comprises a drive system (e.g., motor-operated belt(s), track(s), wheels, etc.) that permit the in-bundle inspection rover to move laterally away from the rover 150 and into the tube bundle region. To facilitate movement of the in-bundle rover 160 between the steam generator U-tubes, the width of the in-bundle rover 160 must correspondingly be less than that of the spacing of adjacent U-tubes (e.g., less than 0.5," less than about 0.25," etc.) and in at least one aspect is about 0.25" in width.

The in-bundle rover 160 comprises a forward facing camera 164, such as a Q-SEE QMSCC ultra-mini color camera, manufactured by Digital Peripheral Systems, Inc. of Anaheim, Calif., which is 4.6 mm in diameter and approximately 17 mm in length. In another aspect, the on-board video and lighting of the in-bundle rover 160 comprises a video probe including a flexible stainless jacket, or a laminated flexible wand, containing structural reinforcement to provide structural support while allowing some flexibility and containing all associated camera and lighting conductors. Optionally, a rear facing camera and/or a down facing camera (front and/or rear) are also provided, with attendant lighting (e.g., LED, IR LED, etc.). The in-bundle rover 160 may also optionally comprise sensors (e.g., non-destructive testing/examination, etc.) and/or retrieval (e.g., grappling) tooling.

The in-bundle rover 160 is attached to the rover 150 by cabling (e.g., electrical cable, A/V cable, etc.) 169, which may be unified in an outer cable jacket, that is in turn connected to a rotating drum configured to let out and retract the cabling 169 as the in-bundle rover 160 moves outwardly and back, respectively, through the steam generator tube 203 columns. In-bundle positioning of the in-bundle rover 160 is accomplished, in at least some aspects, using electronic encoding (e.g., a rotary encoder used in combination with the rotating drum) in combination with the on-board video capabilities to provide feedback on the deployed distance and tube position.

Once the VDS 100 is inserted and the telescoping boom assembly 120 is locked in the upright position, a stabilization leg (not shown) is lowered to further stabilize the system. The telescoping boom assembly 120 is then deployed vertically via the stacked hydraulic cylinder to the desired support plate elevation with height positional feedback provided by sensors, such as string encoders. Once the delivery capsule 130 is at the desired elevation, the rover 150 may be deployed from the delivery housing onto the support plate 225, index the tube columns and begin examinations utilizing its on-board video system. Retrieval of the system begins with recalling the in-bundle rover 160 into the storage bay 158 of the rover 150, recalling the rover 150 into the storage bay 132 of the delivery capsule 130. Once the rover 150 is secured in position, the stack cylinder set slowly releases fluid pressure to lower the system to the collapsed state shown in FIG. 4 and then into the insertion state shown in FIG. 3 by rotation of the telescoping boom assembly 120. The VDS 100 may then be disengaged from the access port 205 and removed.

The hydraulically-controlled telescoping boom assembly 120 is then activated allowing the device to extend vertically to the desired height which may cause the device to proceed through the flow slots of successive support plates 225. Computer-controlled or manually controlled machinery sensitively and accurately measures the height of the distal end of the telescoping boom assembly 120 to ensure precise vertical positioning and of the delivery capsule within the steam generator 200. In conjunction with the vertical extension and monitoring of the vertical position of the telescoping boom assembly 120, the horizontal position of the telescoping boom assembly 120 is also preferably verified visually (e.g., via the delivery capsule camera 134 and/or numerically (e.g., encoder, mechanical distancing apparatuses such as pulleys or gears, position sensors, pattern recognition sensors, etc.). Horizontal movement of the telescoping boom assembly 120 may be accomplished, for example, using a pneumatically-powered registration apparatus to sequentially extend and retract sets of registration guides, finger-like movable members configured to extend from a first position to a second position, to provide a "walking" motion. When each registration guide set is extended, one guide will contact the hot tube and, on the opposing side, another guide will contact the cool tube of the same U-tube.

Thus, in accord with the above-described VDS 100 and rovers 150, 160 borne thereby, an operator may move the delivery capsule to a desired support plate 225, deploy the rover 150 to a desired position along the center lane of the support plate, and further deploy the in-bundle rover 160, which, as noted above, comprises its own drive system (e.g., belt(s), track(s), wheels, etc.) that permit the in-bundle inspection rover to move laterally away from the plate rover and into the tube bundle region.

Figure 11A:
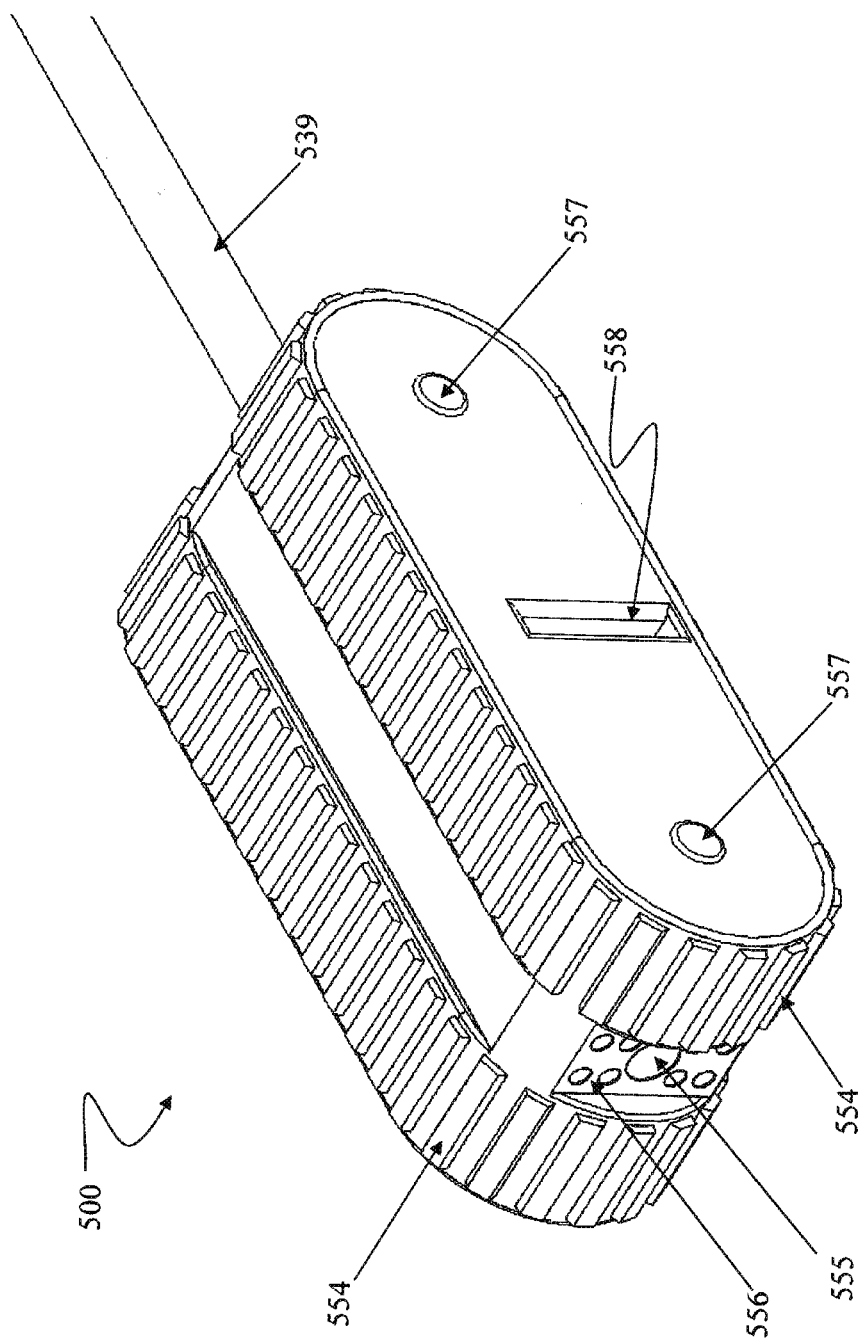
FIG. 11a show another embodiment of an inspection vehicle for inspection steam generators in accord with at least some aspects of the present concepts.
Figure 11B:
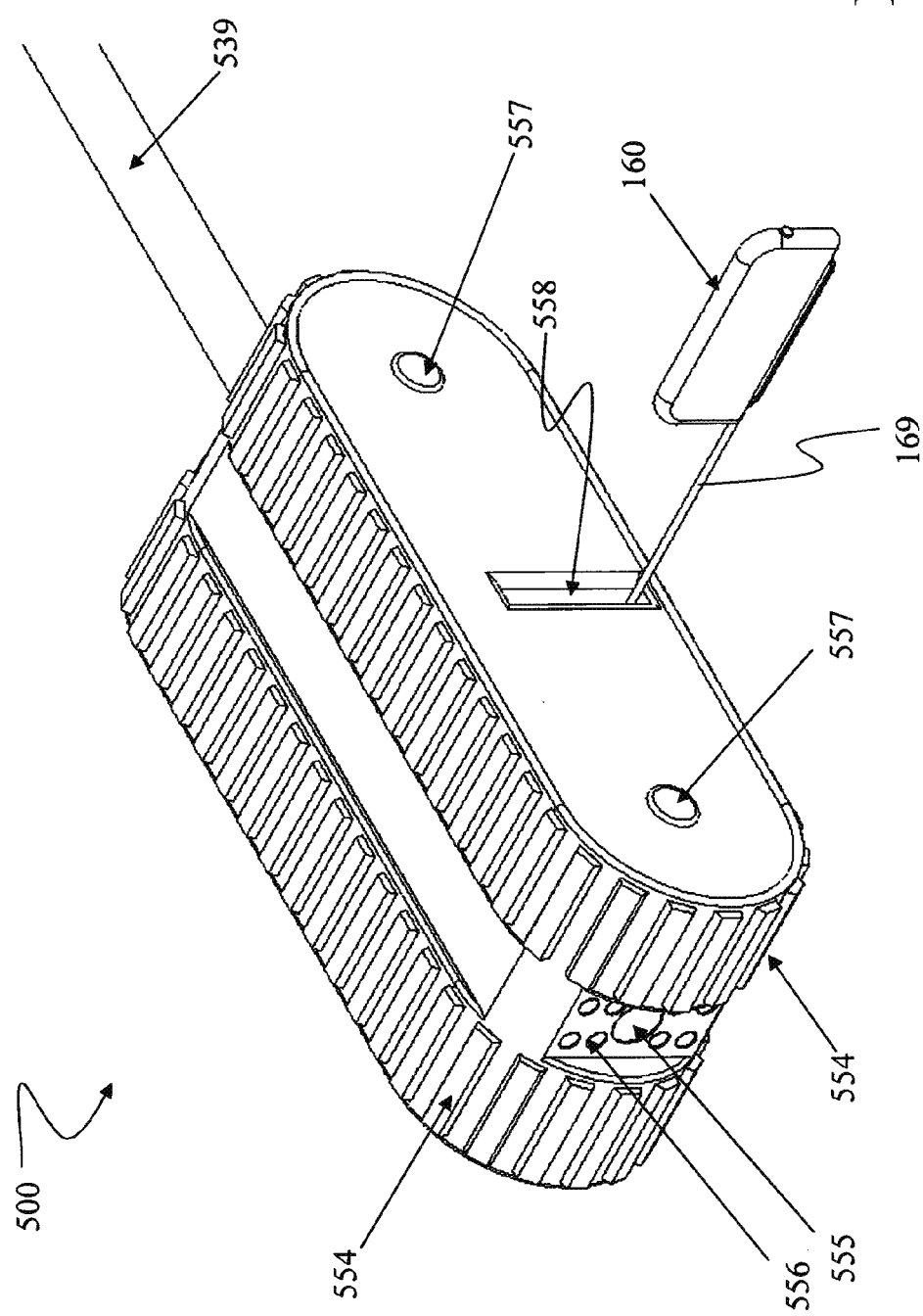
FIG. 11b shows the inspection vehicle of FIG. 11a deploying an in-bundle rover in accord with at least some aspects of the present concepts.

FIGS. 11a-11b show a magnetic rover delivery system 500 configured to be inserted into an access port 205 (e.g., hand hole) of a steam generator 200 or other vessel or enclosed area. The overall dimensions of the magnetic rover 500 are about 8" in length, 3.2" in height, and 3.5" in width. The magnetic rover 500 system is deployable on steam generator models having the Flow Distribution Baffle (FDB) on center or below the hand hole access which have at a minimum a 4" (102 mm) access port or hand hole, wrapper cutouts in the support plates in 3.75" (95.25 mm) wide and 3.6" (91.4 mm) in depth measured from the wrapper tangent to the back of the cut. If the FDB is above the hand hole access the FDB must also contain these cutouts.

The operator of the magnetic rover 500 is located outside of the steam generator (e.g., remotely) and uses a user interface (e.g., GUI, joystick, etc.) to receive sensor feedback from the magnetic rover 500 (e.g., visual feedback, GPS signal, etc.) to control the movement of the magnetic rover. The magnetic rover 500 comprises rare earth magnets (e.g., neodymium, etc.) or electromagnets in the tracks 554 or under tracks 554 (or wheels, optionally provided with scrapers). The total number of magnets in the tracks could vary. In some aspects, there are approximately twenty magnets distributed along each track. In various aspects, the total magnetic force required to maintain the magnetic rover firmly in place when vertically disposed on the wrapped would exceed 5 pounds of force and would still more preferably exceed about 10 pounds of force.

Figure 12A:
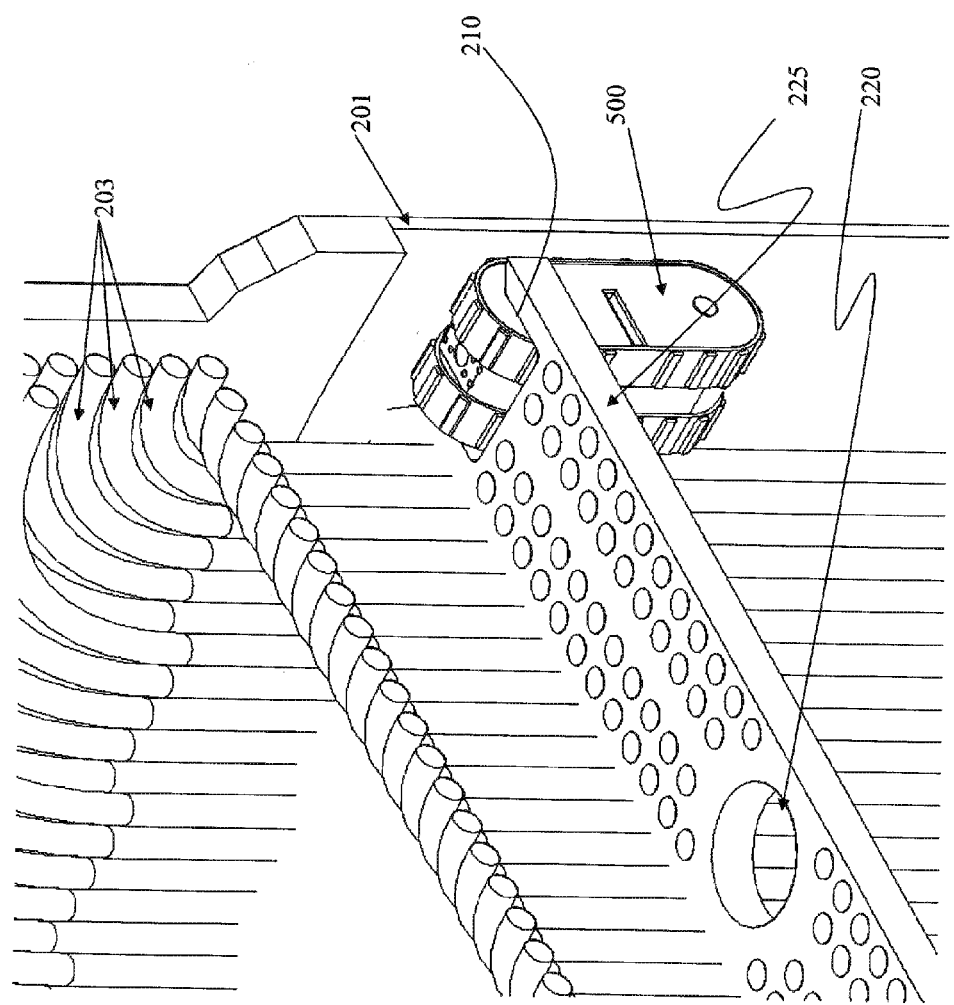
FIGS. 12a-12c show a sequence of movement of the inspection vehicle of FIGS. 11a-11b in accord with at least some aspects of the present concepts transitioning from movement along the steam generator wrapper to a steam generator support plate.

By way of example, the tracks 554 may comprise a rubber lug type track or a custom rubber track with magnet lugs. In another example, a plurality of separate, independently actuatable electromagnets (e.g., front, mid, rear) are provided. The magnetic tracks 554 (or wheels) permit the magnetic rover 500 to climb vertically along the inner diameter (ID) of the steam generator wrapper 201 between the wrapper 201 and the tube 203 bundle and through openings 210 in the tube support plates 225, such as the openings 210 in the FRAMATOME 68/19 steam generator, as shown in FIG. 12a. The magnetic tracks 554 (or wheels) are advantageously, but not necessarily, configured to permit the magnetic rover to also move while upside down.

As shown in FIGS. 11a-11b, a forward-facing camera 555 and associated lights 556 (e.g., LEDs, etc.) are provided for navigation. A storage bay 558, described below, is also provided. FIG. 11b shows an in-bundle rover 160, as described above, deployed from the storage bay 558 of the magnetic rover 500, the in-bundle rover 160 being connected to the magnetic rover 500 by retractable cabling 169, as previously described. A plurality of position and inspection cameras (e.g., HD CCD camera) 557 and corresponding lights (e.g., white LEDs)(not shown) for illumination are advantageously provided in locations about the magnetic rover 500 to provide extensive, potentially even redundant, image data for positional feedback and inspection.

To access the in-bundle region, the magnetic rover 500 utilizes the in-bundle rover 160 to deliver inspection cameras in-bundle, allowing the inspection of many attainable columns of tubes. In one aspect, one camera/lighting assembly 555 is mounted on the front of the crawler and two camera/lighting assemblies are mounted on the lateral sides of the magnetic rover. It is advantageous, but not necessary, for the magnetic rover 550 to comprise a combination of different camera systems of differing cover, such as one or more color camera(s) utilizing LED lighting and one or more infrared cameras utilizing infrared LED's.

The magnetic rover 500 chassis comprises a main frame having dual polymer/magnet tracks 554 are mounted on opposing sides of the frame centerline. The polymer/magnet tracks 554 are independently driven by DC servo-gear motors for use with a closed loop control system or by DC stepper motors allowing use of an open loop control system. Combined with the magnetic tracks 554, the main frame also advantageously houses an electromagnet, or a plurality of electromagnets, utilizable during deployment of the magnetic rover 500 to the various support plate 225 elevations. Mounted on the side of the magnetic rover 500 track carriage is an actuator member 550, such as an electro-mechanical or pneumatic arm, configured to aids the magnetic rover's 500 egression from the wrapper 201 onto the support plate 225 and vice versa by pushing the rover away from or lifting it up to the wrapper.

Figure 12B:
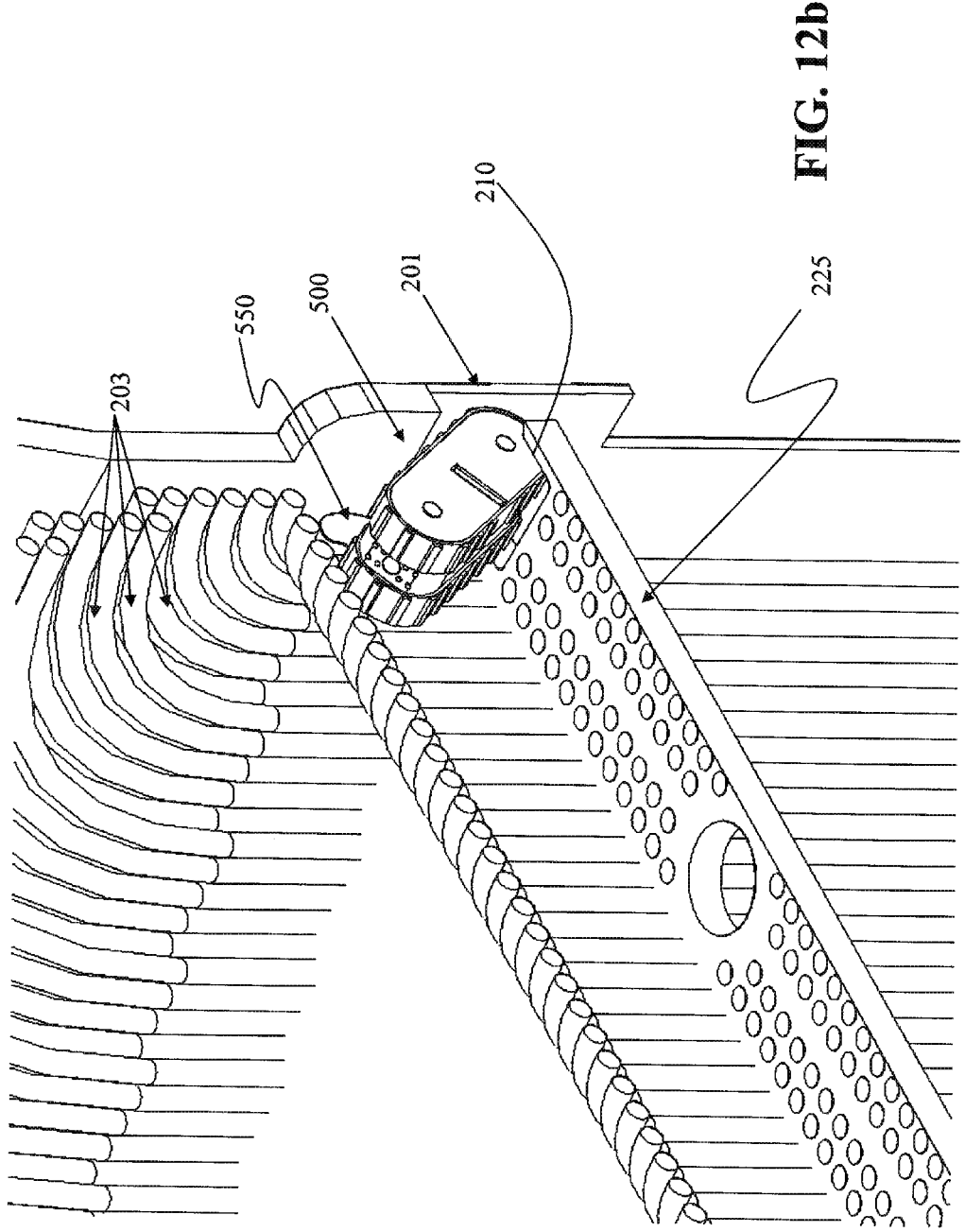

FIG. 12b shows the magnetic rover 500 in an intermediate position transitioning between movement along the steam generator wrapper 201 to movement along the support plate 225. The actuator member 550, noted above, is configured to push against the wrapper 201 to counter the magnetic forces causing the magnetic rover 500 to adhere to the wrapper. The actuator member 550 pushes against the wrapper 201 and rotates generally synchronously with the forward motion of the magnetic rover 500, thereby causing the magnetic rover to separate from the wrapper with an increasing angle for increased forward movement of the magnetic rover. At some point, the center of gravity of the magnetic rover 500 will shift sufficiently so that gravity will pull the front part of the magnetic rover down to the position shown in FIG. 12c.

Alternatively, other devices may be employed to achieve separation of the magnetic rover 500 from the wrapper 201, such as but not limited to, a pneumatic nozzle blowing compressed air or an extendable linear actuator. Where the magnetic rover comprises a plurality of electromagnets, the front, mid, and then rear electromagnets are sequentially deactivated to facilitate the separate of the magnetic rover 500 from the wrapper 201 in conjunction with the action of the actuator member.

Figure 12C:
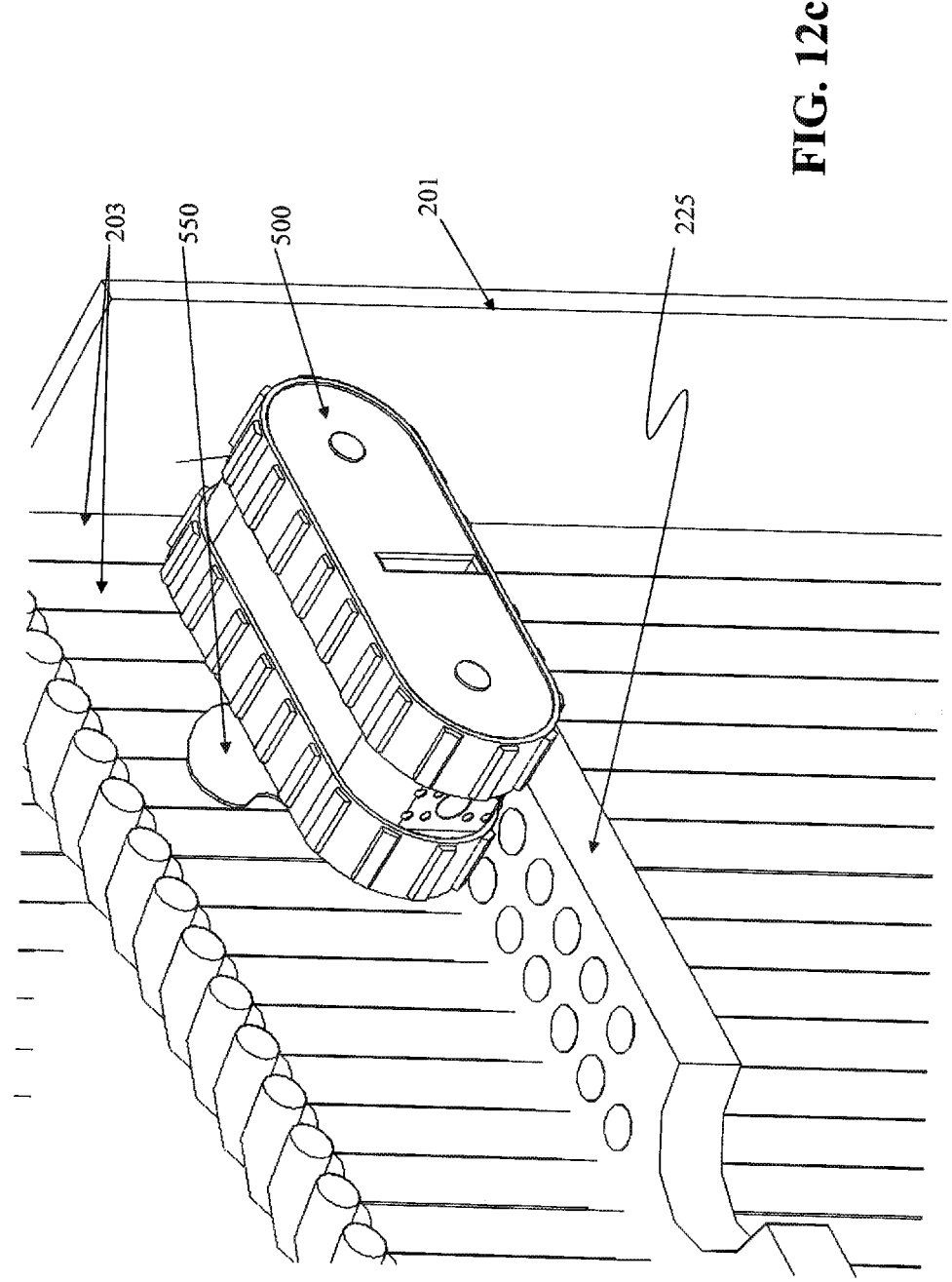
Figure 12E:
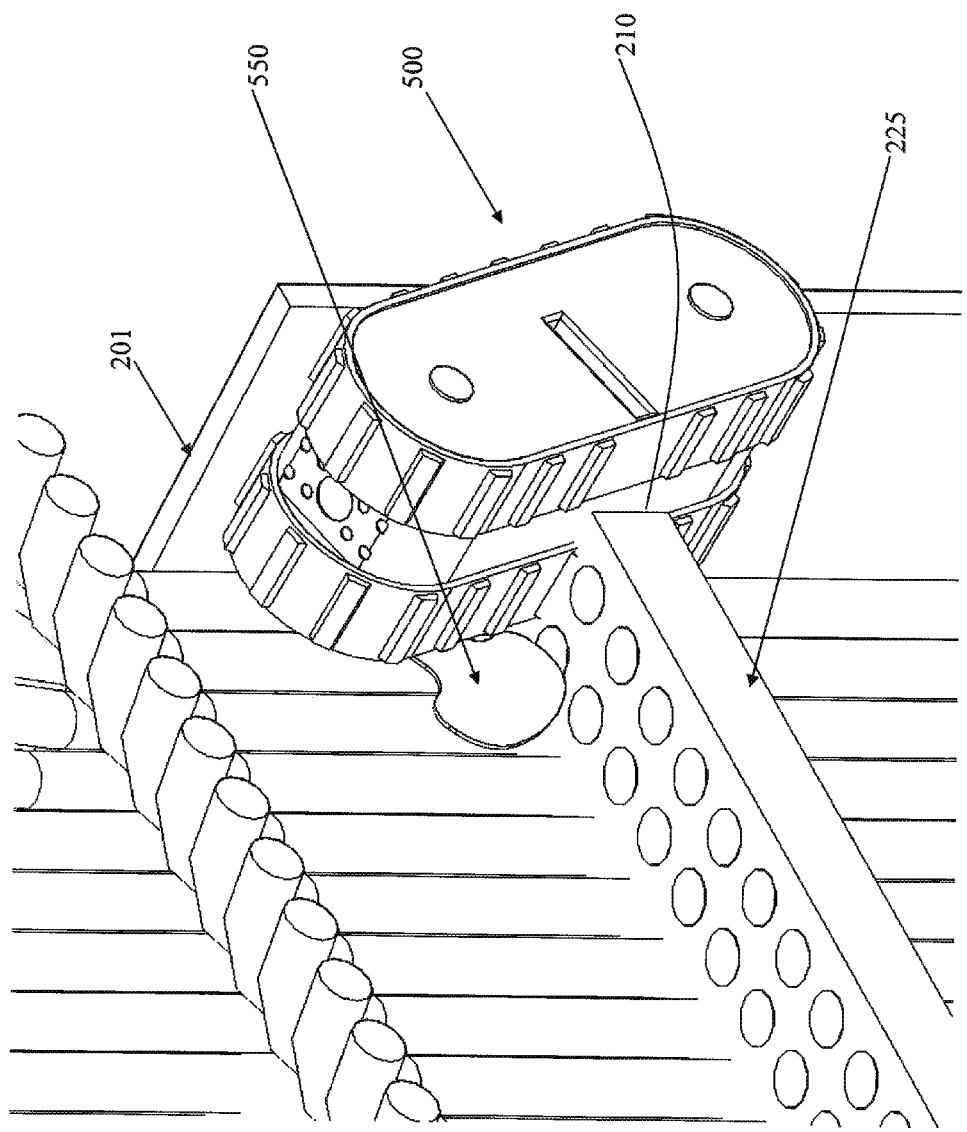
FIGS. 12e-12f show a sequence of movement of the inspection vehicle of FIGS. 11a-11b in accord with at least some aspects of the present concepts transitioning from movement along a steam generator support plate to the steam generator wrapper.
Figure 12F:
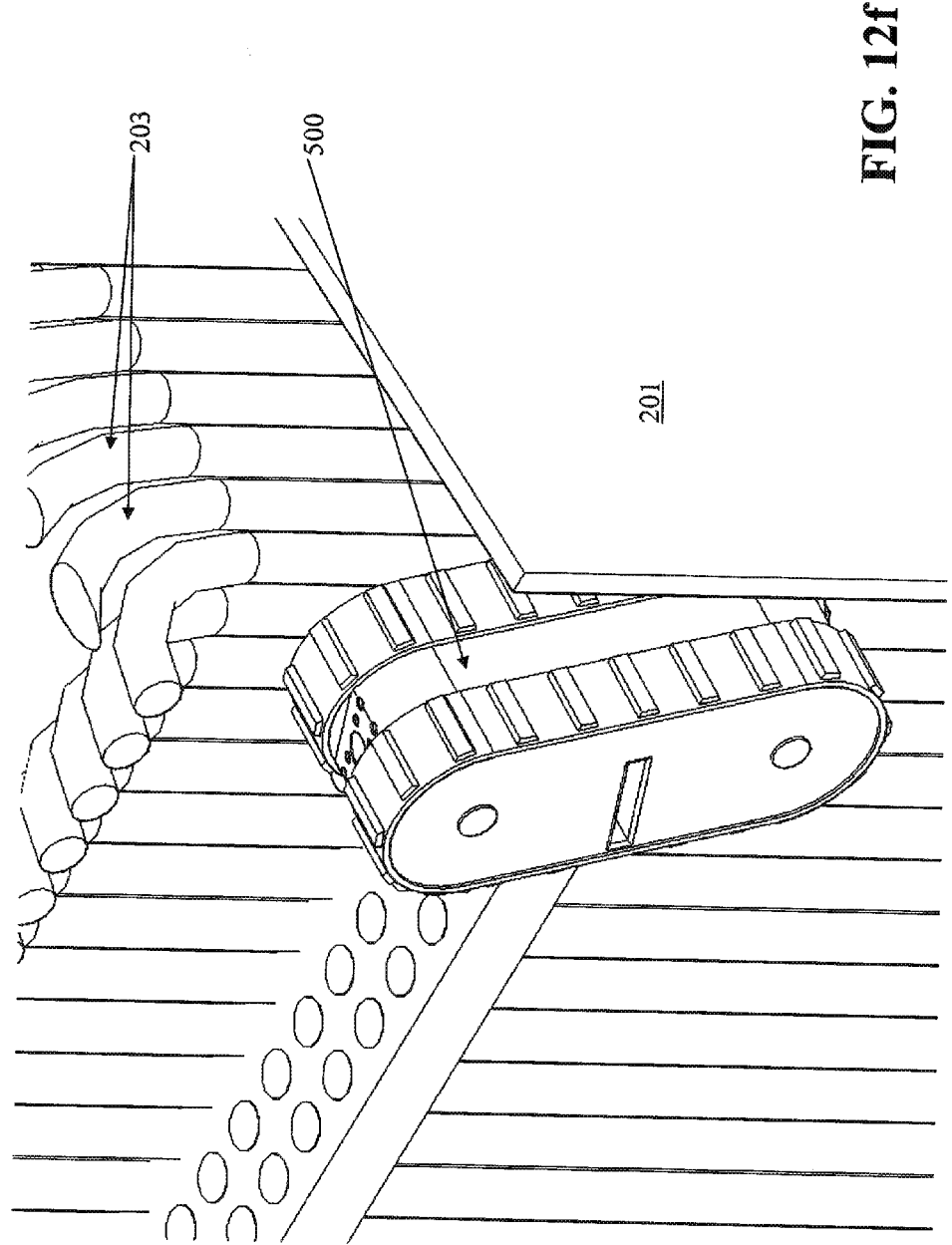
Figure 12H:
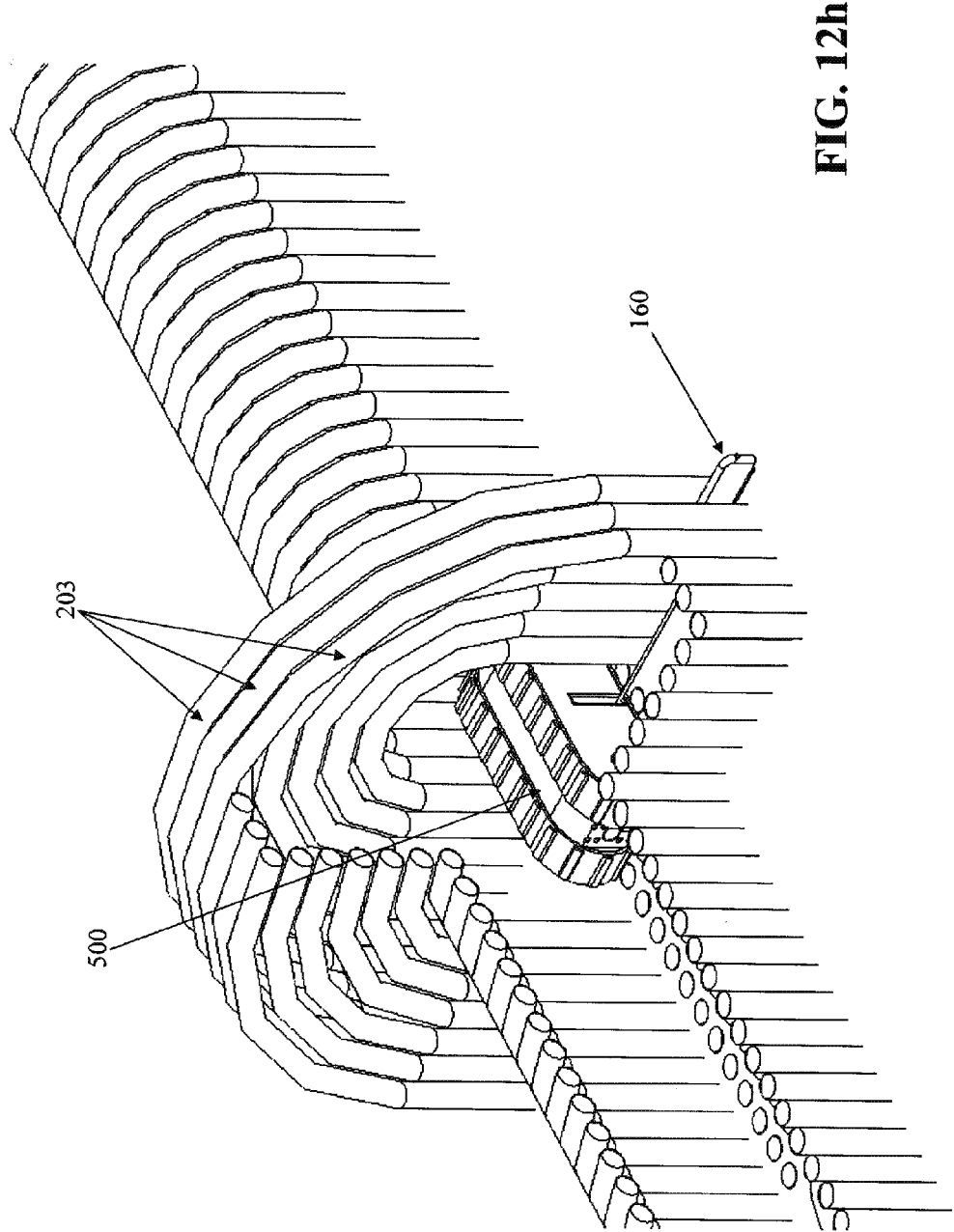
Figure 13:
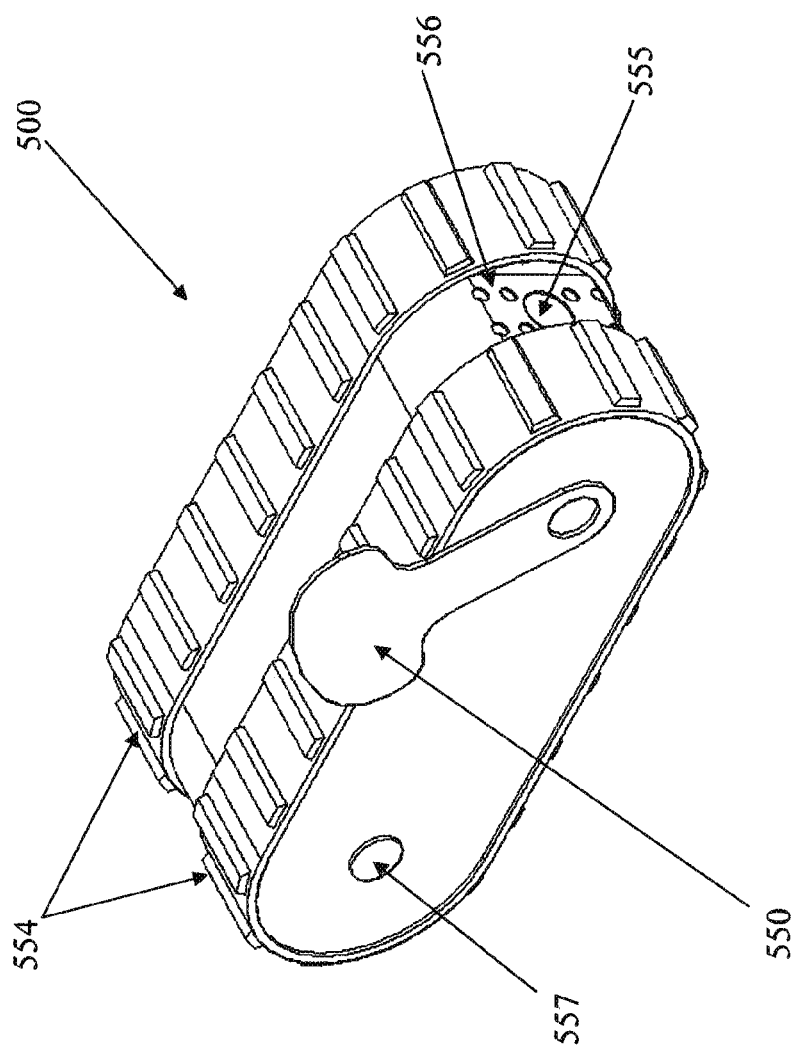
FIG. 13 shows another view of the inspection vehicle of FIGS. 11a-11b in accord with at least some aspects of the present concepts.

FIG. 12c shows the magnetic rover 500 positioned over the opening 210 (not shown in FIG. 12c), wherein it is able to then resume movement along the support plate 225 to any desired location, as is generally shown in FIGS. 12g-12h (or optionally to return and move downwardly back through the opening 210).

FIG. 12d shows the magnetic rover 500 on a support plate 225 in the tube lane region between the hot legs and cold legs of the U-tubes 203. Accordingly, the magnetic rover 500 is configured to both perform inspections and to deploy an in-bundle rover 160, described above, and does not require use of the VDS 100, described above, or other related systems developed by R. Brooks Associates of Williamson, N.Y., shown by way of example in U.S. Pat. Nos. 6,145,583 and 5,265,129, to get into position.

FIGS. 12e-12f show the magnetic rover 500 positioned midway into the opening 210 as it returns back into contact with the steam generator wrapper 201, wherein it would then be able to resume movement upwardly or downwardly along the wrapper. In this operation, the actuator member 550 is deployed differently than that described above with respect to the movement of the magnetic rover 500 onto the support plate 225. Specifically, the actuator member 550 is shown to provide a resistive force against the support plate to retard downward motion of the magnetic rover 500. As the magnetic rover 500 moves into greater and greater contact with the wrapper, the actuator member 550 is rotatable out of the way so as to permit increased forward movement of the magnetic rover. At some point, the magnetic force of the magnetic rover 500 magnets are sufficiently to securely adhere the magnetic rover to the wrapper.

FIGS. 12g-12h show the in-bundle rover 160 in a deployed position wherein the in-bundle inspection rover, under the control of its own drive system 162 (e.g., belt(s), track(s), wheels, etc.) moves laterally away from the magnetic rover 500 and into the tube 203 bundle region. The in-bundle rover 160 itself comprises, as noted above, a variety of cameras (e.g., front, rear, down) and associated lights (e.g., white LEDs) providing positional data useful for maneuvering and/or positioning the in-bundle rover, as well as for obtaining useful inspection data.

The magnetic rover 500 is controlled via cabling 539 containing all associated control, video and auxiliary conductors for operation of the magnetic rover, in-bundle rover 160 and all associated systems (e.g., lighting, video, actuators, etc.). On-board equipment for the magnetic rover 500 and/or the in-bundle rover 160 may include, but is not limited to, camera/LED units of various type (e.g., color, black and white, IR, etc.) allowing a wide range of viewing options, to stored examination probes/devices, sensors, and tools and retrieval tooling that may be deployed from the magnetic rover 500 storage bay 558 or another storage bay. For example, a robotic arm (not shown) may be used to attach and remove a variety of tools and sensors to corresponding ports of the in-bundle rover 160.

The magnetic rover 500 system advantageously utilizes a cable management system like that shown in U.S. patent application Ser. No. 12/714,090, titled "Inspection System And Inspection Process Utilizing Magnetic Inspection Vehicle," which is assigned to the assignee of the present application, and which is incorporated herein by reference in its entirety, to feed in and feed out the appropriate amount of cabling. Such cable management system feeds and controls the cables and tubes linking the magnetic rover 500 to external systems (e.g., computer used by operator, open loop control box, etc.) and comprises, for example, a mount flange to permit the cable management system to be mounted to the steam generator access port 205 and a roller housing that houses the rollers and motors that grip or "pinch" the cabling to positively drive it into or out of the steam generator responsive to or synchronously with control signals provided by the operator to the magnetic rover. Electric drive motors, such as MicroMo 2842S012S+30/1 246:1 motors, may be used in combination with rollers to pinch and push the cable in or out of the access port. The cable management system also advantageously comprises a tension adjuster comprising a shaft that can be pulled to facilitate cable installation and a spring to maintain tension on the cable(s). An electrical interface box comprises the electrical connection point or interface between the internal electric DC servo motors of the cable management system and the control module, the open loop control system (OLCS). To set up the magnetic rover 500 for inspection, a cable management mounting plate is installed to the access port and the magnetic rover is inserted into the steam generator 200 and the cable (reference number 539 in FIG. 11a) is threaded through the cable entry of the cable guide, which is then installed on the access port. A motorized cable feeder is then mounted to the access port mount and the cable 539 inserted through a cable slot by pulling up on a spring loaded plate. When the cable 539 is properly positioned between the feed wheels, the spring plate is released and both the front and back cable 539 positioned and held in place. The cable container is positioned directly behind the cable management system and cable coiled inside so to minimize any tangling.

The foregoing disclosure has been presented for purposes of illustration and description. The foregoing description is not intended to limit the present concepts to the forms, features, configurations, modules, or applications described herein by way of example. Other non-enumerated configurations, combinations, and/or sub-combinations of such forms, features, configurations, modules, and/or applications are considered to lie within the scope of the disclosed concepts.

What is claimed is:

1. An inspection system configured to inspect a secondary side of a steam generator, comprising:
   a first boom;
   a second, telescoping boom having a proximal end pivotally attached to the first boom to permit upward rotation of the second, telescoping boom relative to the first, telescoping boom by an angle of about 90 degrees, and the second, telescoping boom comprising a distal end bearing a delivery capsule, the delivery capsule defining a storage bay;
   a first robotic inspection vehicle dimensioned to fit in the delivery capsule storage bay, the first robotic inspection vehicle defining a storage bay and comprising at least one inspection camera and at least one lighting system, the first robotic inspection vehicle further comprising cabling connecting the first robotic inspection vehicle to the delivery capsule; and
   a second robotic inspection vehicle dimensioned to fit in the first robotic inspection vehicle storage bay, the second robotic inspection vehicle comprising a drive system, at least one inspection camera and at least one lighting system and further comprising cabling connecting the second robotic inspection vehicle to the first robotic inspection vehicle.

2. The inspection system according to claim 1, wherein the delivery capsule comprises at least one camera and at least one lighting system.

3. The inspection system according to claim 2, wherein the first robotic inspection vehicle comprises a plurality of cameras and a plurality of lighting systems.

4. The inspection system according to claim 3, wherein the second robotic inspection vehicle comprises a plurality of cameras and a plurality of lighting systems.

5. The inspection system according to claim 1, wherein the first robotic inspection vehicle comprises a plurality of tracks or wheels.

6. The inspection system according to claim 5, wherein an opening for the first robotic inspection vehicle storage bay is disposed on a lateral side of the first robotic inspection vehicle.

7. The inspection system according to claim 1, wherein the delivery capsule is rotatably attached to the distal end of the second, telescopic boom and is coupled to the distal end of the second, telescopic boom by a rotary actuator to rotate about a longitudinal axis of the second, telescopic boom.

8. The inspection system according to claim 1, wherein the second robotic inspection vehicle drive system utilizes a single track.

9. The inspection system according to claim 1, wherein the second robotic inspection vehicle has a width of less than 1.0 inch.

10. The inspection system according to claim 1, wherein the second robotic inspection vehicle has a width of less than 0.5 inches.

11. A vehicular inspection system configured to inspect a secondary side of a steam generator, comprising:
a magnetic inspection vehicle comprising a drive system utilizing magnets, electromagnets, or a combination thereof to facilitate independent vertical movement of the magnetic inspection vehicle along a vertical surface comprising a ferrous metal, the magnetic inspection vehicle defining a storage bay and comprising at least one inspection camera and at least one lighting system, the magnetic inspection vehicle further comprising cabling connecting the magnetic inspection vehicle to, at a distal end, to one or more of a cable management system, a video screen, a power supply, and a controller outside of a steam generator; and
an in-bundle robotic inspection vehicle dimensioned to fit in the magnetic inspection vehicle storage bay, the in-bundle robotic inspection vehicle comprising a drive system, at least one inspection camera and at least one lighting system and further comprising cabling connecting the in-bundle robotic inspection vehicle to the magnetic inspection vehicle.

12. The vehicular inspection system according to claim 11, wherein the magnetic inspection vehicle comprises a plurality of cameras and a plurality of lighting systems.

13. The vehicular inspection system according to claim 12, wherein the in-bundle robotic inspection vehicle comprises a plurality of cameras and a plurality of lighting systems.

14. The vehicular inspection system according to claim 11, wherein a driving member of the in-bundle robotic inspection vehicle comprises a single track.

15. The vehicular inspection system according to claim 14, wherein an opening for the magnetic inspection vehicle storage bay is disposed on a lateral side of the magnetic inspection vehicle.

16. The vehicular inspection system according to claim 11, wherein a driving member comprises a plurality of tracks or wheels.

17. The vehicular inspection system according to claim 11, wherein the in-bundle robotic inspection vehicle has a width of less than 1.0 inch.

18. The vehicular inspection system according to 11, wherein the in-bundle robotic inspection vehicle has a width of less than 0.5 inches.

19. A vehicular inspection system configured to inspect a secondary side of a steam generator, comprising:
a first inspection vehicle comprising a first drive system, a plurality of inspection cameras and a plurality of lights, the first inspection vehicle comprising a chassis defining an internal storage bay, the first inspection vehicle further comprising cabling connecting the first inspection vehicle to a distal controller; and
an in-bundle robotic inspection vehicle comprising a second drive system, the in-bundle robotic inspection vehicle being dimensioned to fit in the first inspection vehicle internal storage bay, the in-bundle robotic inspection vehicle comprising a plurality of inspection cameras and a plurality of lights and further comprising cabling connecting the in-bundle robotic inspection vehicle to the first inspection vehicle,
wherein the first drive system consists of only two tracks, and
wherein the second drive system consists of only one track.

20. A vehicular inspection system configured to inspect a secondary side of a steam generator, comprising:
a magnetic inspection vehicle comprising a body and a drive system utilizing a first track and a second track, the first track and the second track being disposed opposite to one another on opposite sides of the magnetic inspection vehicle body, the magnetic inspection vehicle body defining a storage bay and comprising at least one inspection camera and at least one lighting system, the magnetic inspection vehicle body further comprising cabling connecting the magnetic inspection vehicle to, at a distal end, to one or more of a cable management system, a video screen, a power supply, and a controller outside of a steam generator; and
an in-bundle robotic inspection vehicle dimensioned to fit in the magnetic inspection vehicle storage bay, the in-bundle robotic inspection vehicle comprising a drive system, at least one inspection camera and at least one lighting system and further comprising cabling connecting the in-bundle robotic inspection vehicle to the magnetic inspection vehicle,
wherein the magnetic inspection vehicle further comprises an actuator member configured, in a first position or first range of positions, to push against a first surface on which the magnetic inspection vehicle is magnetically adhered to overcome a magnetic adhesion between the magnetic inspection vehicle and the surface in the region of the actuator member and separate a portion of the magnetic inspection vehicle from the surface to permit transition of the magnetic inspection vehicle into an intermediary state between the first surface and a second surface, and
wherein the actuator member is configured, in a second position or second range of positions, to retard an advancement of the magnetic inspection vehicle when the magnetic inspection vehicle is in an intermediary state between a first surface and a second surface until such time as the magnetic inspection vehicle is magnetically adhered to the first surface.

* * * * *